United States Patent [19]
Aiba et al.

[11] Patent Number: 5,771,055
[45] Date of Patent: Jun. 23, 1998

[54] LASER PRINTER CAPABLE OF COOLING HEAT GENERATING PARTS AS WELL AS REDUCING NOISE

[75] Inventors: Masahiko Aiba; Ken-ichi Morimoto, both of Nara; Kouichi Moriyama, Ikoma; Yuhi Yui, Nabari; Tokio Awata, Ikoma; Satoshi Murakami, Yamatokoriyama, all of Japan

[73] Assignee: Sharp Kabushiki Kaisha, Osaka, Japan

[21] Appl. No.: 625,020

[22] Filed: Mar. 28, 1996

[30] Foreign Application Priority Data

Mar. 28, 1995 [JP] Japan .................................. 7-070070

[51] Int. Cl.⁶ ........................... B41J 2/385; G03G 13/04
[52] U.S. Cl. ........................................ 347/134; 347/260
[58] Field of Search .................................. 347/260, 261, 347/257, 242, 243, 263, 245, 134; 399/92; 181/202, 205, 224, 225; 165/166

[56] References Cited

U.S. PATENT DOCUMENTS

| | | | |
|---|---|---|---|
| 4,348,604 | 9/1982 | Thode | 165/166 |
| 4,383,755 | 5/1983 | Fedder et al. | 347/259 |
| 5,343,029 | 8/1994 | Katoh et al. | 359/216 |
| 5,453,647 | 9/1995 | Hedeen et al. | 181/202 |

FOREIGN PATENT DOCUMENTS

| | | |
|---|---|---|
| 0 618 469 | 5/1994 | European Pat. Off. . |
| 58-046317 | 2/1983 | Japan . |
| 62-144129 | 4/1987 | Japan . |
| 6-331920 | 8/1994 | Japan . |
| 6-337365 | 9/1994 | Japan . |

Primary Examiner—N. Le
Assistant Examiner—L. Anderson
Attorney, Agent, or Firm—David G. Conlin; David D. Lowry

[57] ABSTRACT

A novel laser printer is disclosed, in which heat generating parts are positively cooled while reducing the noise generated by a blowing mechanism. A rotor of the motor for rotating a scanning mirror of a scanning device is surrounded by a cover. An air flow inlet port and an air flow outlet port are formed on the sides of the cover. The space in the proximity of the air flow inlet port and the air flow outlet port is divided by an air flow separation member. One longitudinal end of the air flow separation member is close to the rotor and the other longitudinal end and the lateral ends thereof are connected to the cover. The air flow separation member partially divides the rotating air flow generated around the rotor in the proximity of the air flow outlet port, and generates the discharge air flow, which in turn is discharged out of the cover. A suction air flow is introduced from the air flow inlet port to the interior of the cover which is now negative in pressure, in the form of the rotating air flow.

16 Claims, 15 Drawing Sheets

FIG.5A
FIG.5B
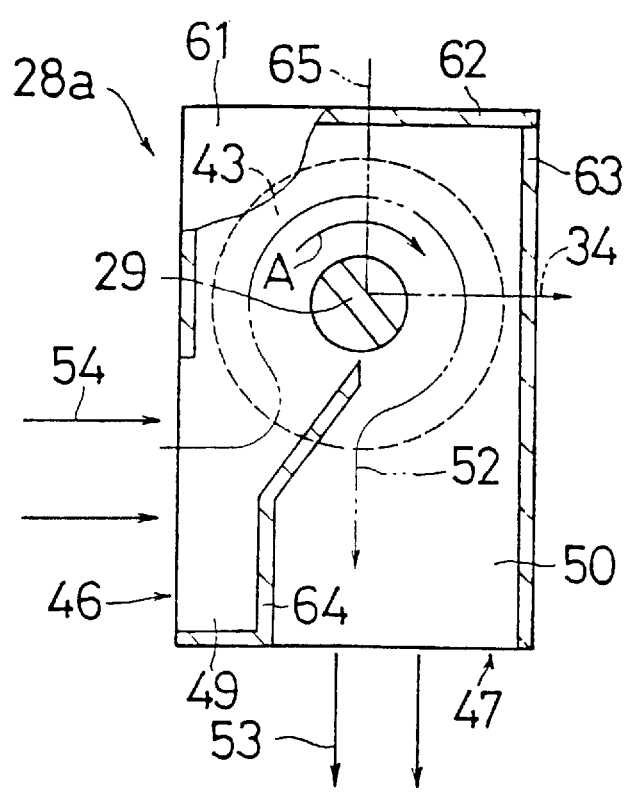
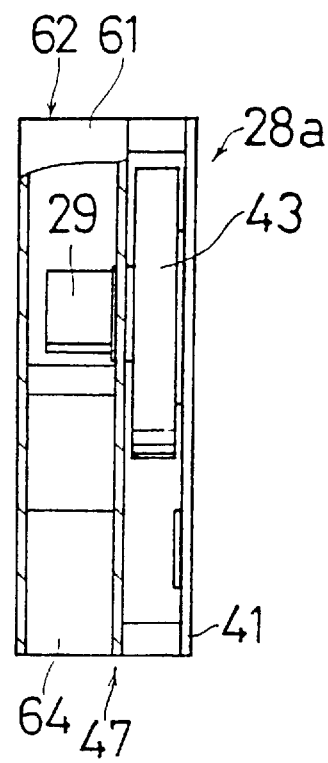

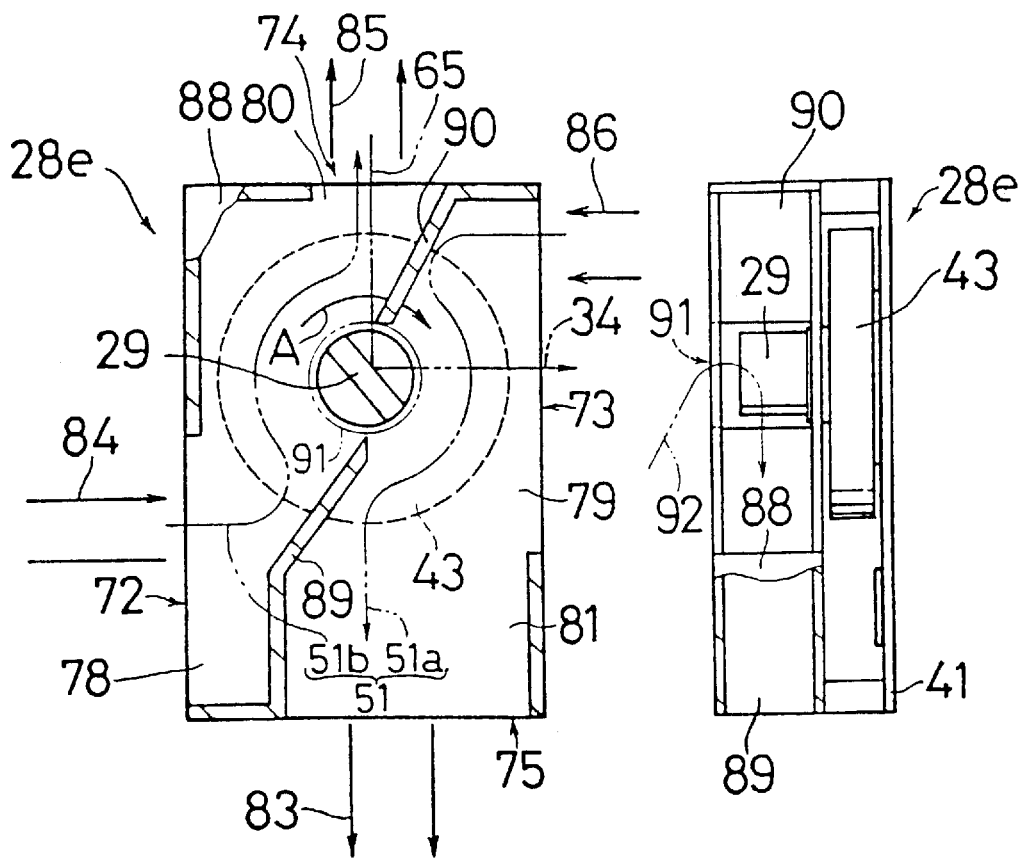

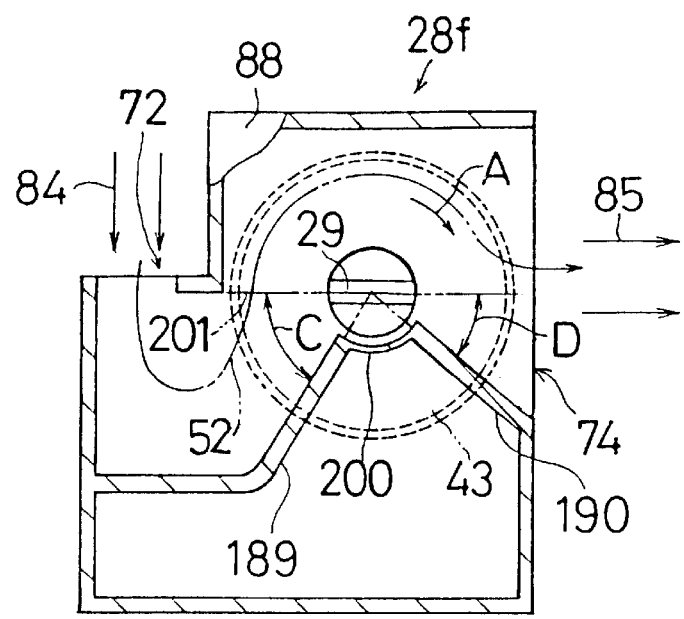
FIG.15A
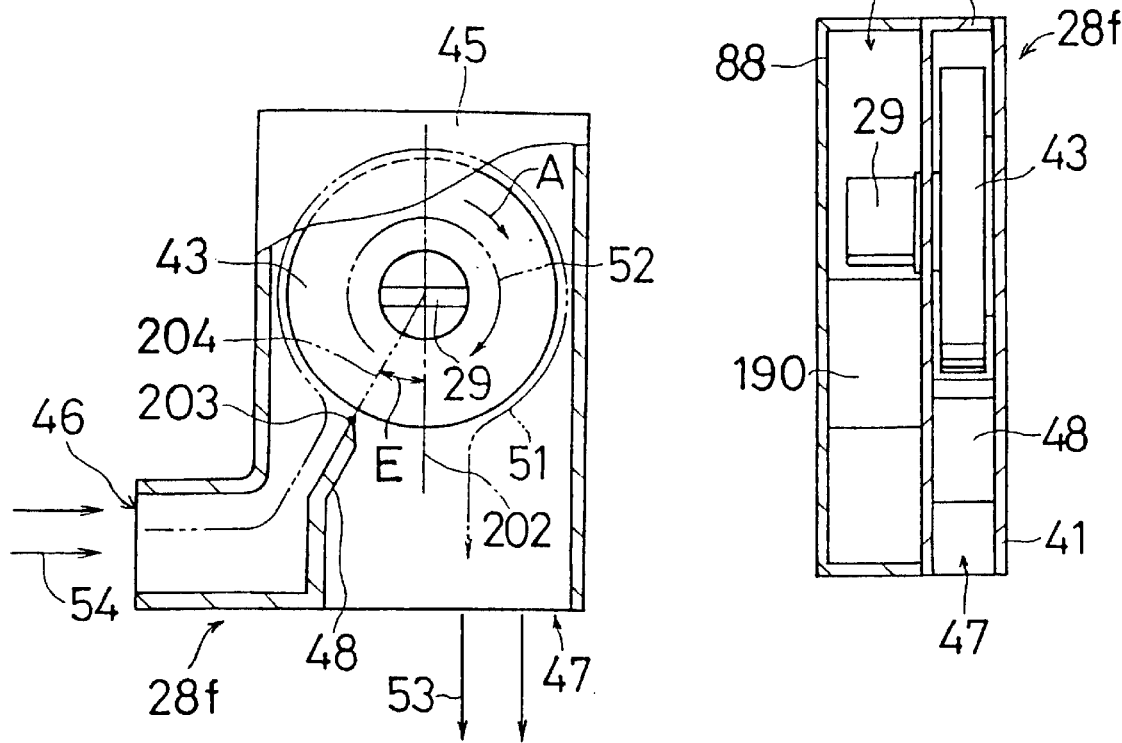
FIG.15B
FIG.15C

PRIOR ART　PRIOR ART

LASER PRINTER CAPABLE OF COOLING HEAT GENERATING PARTS AS WELL AS REDUCING NOISE

BACKGROUND OF THE INVENTION

1. Field of the Invention

The present invention relates to a laser printer for converting electrical information into laser light information and recording the laser light information on a recording medium through a photosensitive member or the like.

2. Description of Related Art

A laser printer applying electrophotography is well known in which a laser beam is irradiated on a photosensitive member for exposure. In a laser printer, a laser beam is irradiated in a predetermined direction from a light-emitting device in which turn on/off of a laser beam is controlled in accordance with image information to be printed. The laser beam is reflected on a rotating scanning mirror of a scanning device in such a manner as to be displaced in a direction of a predetermined scanning range to sequentially scan the surface of the photosensitive member. As a result of the laser beam scanning the surface of the photosensitive member, the electrons charged uniformly in advance on the photosensitive member are selectively discharged, and an electrostatic latent image corresponding to the laser beam is formed on the photosensitive member. A toner image formed in association with this electrostatic latent image is transferred onto the surface of recording paper and fixed under heat to print an image on the recording paper.

A great amount of heat is generated from a heater for fixing the toner image and a control circuit or the like including a power circuit in the laser printer. In the case where a semiconductor laser diode or the like is used for the light-emitting device, heat is also generated from the diode. The photosensitive member and the light-emitting device are deteriorated in a high-temperature environment. Also, the toner of minute particles filled in the developer or the like tends to be solidified at high temperatures.

In order to prevent the adverse effect caused by heat, a conventional laser printer comprises a cooling fan for blowing and cooling the heat generating parts including the heater and the control circuit. Japanese Unexamined Patent Publication JPA 62-144129 (1987) discloses an art for cooling the heat generating parts by a rotating air flow around the rotating scanning mirror for scanning the laser beam.

FIG. 17A is a plan view showing a configuration of a scanning device 1 of a conventional laser printer. FIG. 17B is a side view showing the scanning device 1 in FIG. 17A. A scanning mirror 2 and a rotor 3 of the motor for driving the scanning mirror 2 of the scanning device 1 are rotated at high speed. Rotating air flows 4, 5 are thus generated by the viscosity of air around the scanning mirror 2 and the rotor 3. In the above-described conventional system disclosed in JPA 62-144129 (1987), a rotative polygon mirror unit constituting a scanning device includes a box-like case, a part of which is formed with an air inlet aperture and an air outlet aperture. The rotating air flow generated by the rotation of the rotative polygon mirror providing the scanning mirror is recovered from the inlet or outlet aperture, and led to a semiconductor laser making up a heat generating part for the purpose of cooling the same.

As described above, since the heat generated in the laser printer is a cause of deterioration of the photosensitive member or the light-emitting device and solidification of the toner, it is necessary to cool the interior of the laser printer. In the case where a cooling fan or the like is provided for this purpose, a high-speed rotating object like the cooling fan, however, is an annoying source of noises. As office noises are a problem of an increasing importance, measures are required to reduce the noises generated from the laser printer. The cooling fan, which is a component part required only for cooling, is difficult to double as another part of the printer and therefore undesirably contributes to a higher cost.

With the configuration disclosed in JPA 62-144129 in which the heat generating parts are cooled by recovering the rotating air flow covered around the scanning mirror or the like, a sufficient blowing capacity cannot be obtained unless the scanning mirror reaches a very high rotational speed. Another problem of a general laser printer is that toner flying from the developer in the apparatus, paper dust generated from the recording paper, external dust intruded into the apparatus and the like may attach to the light-emitting device, the scanning device or other parts of the optical system in the apparatus and disturb the laser beam. The technique disclosed in JPA 62-144129 poses the problem that the scanning mirror and the like are liable to be fouled in contact with the atmospheric air containing the toner, paper dust.

SUMMARY OF THE INVENTION

An object of the invention is to provide a laser printer capable of securely cooling heat generating parts as well as reducing noises.

The invention provides a laser printer comprising:

a photosensitive member;

exposure means for scanning a laser beam by rotating a scanning mirror by a motor, exposing the surface of the photosensitive member to the laser beam, and forming an electrostatic latent image;

developing means for developing the electrostatic latent image into a visible toner image;

transfer means for transferring the toner image onto the surface of a recording medium; and fixing means for fixing the toner image transferred onto the surface of the recording medium; the laser printer further comprising:

air flow generating means for forming an air flow inlet section and an air flow outlet section by stemming rotating air flow generated around a rotative member by air flow separation members, and generating an air flow different from the rotating air flow, the air flow generating means being arranged to surround the rotative member including the scanning mirror; and duct means for connecting at least one of the air flow inlet section and the air flow outlet section to a predetermined heat generating part.

Further in the laser printer of the invention it is preferable that the air flow generating means is arranged in such a position as to surround the rotor of the motor for rotating the scanning mirror and at least one of the air flow separation members is arranged around the rotor.

Further in the laser printer of the invention it is preferable that the air flow generating means is arranged in such a position as to surround the scanning mirror and at least one of the air flow separation members is arranged around the scanning mirror.

Further in the laser printer of the invention it is preferable that the air flow generating means includes an air flow inlet port in the proximity of the rotation center of the scanning mirror.

Further in the laser printer of the invention it is preferable that the laser printer further comprises filter means for removing dust which deteriorates optical characteristics of the scanning mirror, disposed in an air path into the air inlet section.

Further in the laser printer of the invention it is preferable that the laser printer further comprises filter means for removing dust which deteriorates optical characteristics of the scanning mirror, disposed in the air flow inlet port.

Further in the laser printer of the invention it is preferable that the duct means connects the air flow inlet section to the predetermined heat generating part and has at least one bent portion.

Further in the laser printer of the invention that it is preferable that the duct means has a dead end on the downstream side in the direction of air flow into the bent portion.

According to the invention, in the laser printer, the surface of a light sensitive member is exposed to a laser beam by being scanned to form an electrostatic latent image corresponding to an image to be printed. The laser beam is irradiated from a light source at a predetermined position, reflected on the scanning mirror and reaches the surface of the photosensitive member. The scanning mirror is rotated by a motor to change the reflection angle of the laser beam and thereby the photosensitive member is scanned by the laser beam. The electrostatic latent image is developed into a visible form as a toner image by the developing means. The toner image is transferred onto the surface of a recording medium by the transfer means. The toner image thus transferred onto the surface of the recording medium is fixed into a fast image, for example, by fusion and solidification.

The air flow generating means is arranged to surround a rotative member including the scanning mirror and air flow separation members are provided inside the air flow generating means. When the rotating air flow generated around the rotative member is stemmed by the air flow separation members, a discharge air flow is generated at the air flow outlet section in the proximity of the air flow separation member. The air pressure in the air flow inlet section downstream in the direction of rotation of the rotative member becomes lower than the air pressure at the air flow separation member. A suction air flow is generated in order to compensate for the differential air pressure. An air flow different from the rotating air flow thus is generated at the air flow inlet section and the air flow outlet section. The different air flow generated in this way by the air flow separation member in the air flow generating means is stronger than the rotating air flow generated simply through an opening formed in the air flow generating means in the prior art. An air blowing capacity with a higher efficiency can thus be obtained according to the invention.

At least one of the air flow inlet section and the air flow outlet section is connected by duct means to a heat generating part to be cooled. In view of the fact that the duct means is connected to the selected one of the air flow inlet section and the air flow outlet section, the air flow generating means is used as either of a suction blower and an ordinary blower. In the case where the speed of the rotating air flow is low, the air blower is used as a suction blower. In the case where the heat generating part and the air flow generating means are distant from each other with long duct means, in contrast, the air flow generating means is used as an ordinary blower.

According to the invention, the air flow generating means is arranged in such a position as to surround the rotor of a motor for rotating the scanning mirror, and at least one of air flow separation members is arranged around the rotor. As a result, in the case where the air flow generating means is used either as a suction blower or as an ordinary blower, air containing dust or the like is prevented from being supplied to the surrounding of the scanning mirror. Attachment of the dust to the scanning mirror is thus minimized.

According to the invention, the air flow generating means is arranged in such a position as to surround the scanning mirror, and includes at least one air flow separation member arranged around the scanning mirror. The rotating air flow generated around the rotor having a true circular section is minuscule when the rotor is running at a low rotational speed. In contrast, the rotating air flow generated around a rotating object with a non-circular section such as a tabular scanning mirror, for example, is stronger and therefore can improve the blowing capacity.

According to the invention, the air flow generating means arranged in such a position as to surround the scanning mirror has an air flow inlet port in the proximity of the rotation center of the scanning mirror. The centrifugal force generated by the rotating air flow around the scanning mirror introduces the air from the air flow inlet port, and the internal rotating air flow is strengthened, thereby further improving the blowing capacity.

According to the invention, the air flow generating means arranged in such a position as to surround the scanning mirror includes filter means in the path leading the air into the air flow inlet section. Also, in the case where the air flow generating means has an air flow inlet port at the center of the scanning mirror, filter means is added to the air flow inlet port. As a result, dust can be removed from the air flowing into the air flow generating means surrounding the scanning mirror. It is thus possible to prevent deterioration of the optical characteristics of the scanning mirror which otherwise might be caused by the dust being attached to the scanning mirror.

According to the invention, the duct means connects the air flow inlet section to the predetermined heat generating part and has at least one curved portion. Also, a dead end is formed downstream of the bent portion in the direction of inward air flow. Consequently, in the case where the air flow generating means arranged to surround the scanning mirror is used a suction blower, dust can be removed from the air flow into the air flow generating means without any filter means. The air flow in the duct means is not blocked even when the dust removed are accumulated in the duct means. Also, dust is accumulated in the dead end formed this way. Even in the case where the duct means is subjected to vibrations due to movement of the apparatus or other reason, dust is prevented from being scattered in the air flow path in the duct means.

According to the invention, there is provided a laser printer in which an electrostatic latent image is formed on the surface of a photosensitive member by a laser beam, the electrostatic latent image is developed into a visible form as a toner image. After the being transferred to a recording medium, the toner image is fixed and desire image is printed. In order to cool the interior of the laser printer, a rotating air flow generated around and thus surrounding a rotative member including the scanning mirror for scanning the laser beam is stemmed by an air flow separation member. As a result, an air flow different from the rotating air flow is generated from the air flow inlet section and the air flow outlet section and led through the duct means to the heat generating part to be cooled. The components parts contributing to noises such as the cooling fan are thus eliminated, thereby reducing the noises generated by the printer being driven. Also, the load on the power supply in the apparatus is reduced while at the same time reducing the size of the apparatus. Further, the production cost is reduced by eliminating the cooling fan.

The air flow generating means surrounding a rotative member including the scanning mirror, in which an air flow separation member is provided, can be used as a suction blower or an ordinary blower by connecting selected one of the air flow inlet section and the air flow outlet section thereof to the duct means. In the case where the rotational speed of the rotative member is low, the air flow generating means is operated as a suction blower, whereby fresh external air is introduced directly from the atmosphere into the heat- generating parts with a high cooling effect. In the case where the heat generating part is distant from the air flow- generating means, on the other hand, the air flow generating means is used as an ordinary blower, whereby the blowing loss attributable to the duct means can be reduced and a higher cooling effect achieved.

According to the invention, the air flow generating means is arranged in such a position as to surround only the rotor of a motor for rotating a scanning mirror. Only the rotating air flow around the rotor is used as a blower in isolation from the scanning mirror, so that dust is prevented from attaching to the scanning mirror and the reliability of the laser optical system is maintained.

Since at least one air flow separation member is arranged around the rotor, it is possible to generate an air flow stronger than and different from the air flow generated directly from the rotating air flow. The blowing capacity can thus be improved. Also, provision of a plurality of air flow separation members can produce a plurality of such different air flows. A plurality of heat generating parts existing in the apparatus can thus be cooled simultaneously without sacrificing the blowing capacity of the air flow generating means.

According to the invention, the air flow generating means is arranged in such a position as to surround the scanning mirror. In view of the fact that the rotative member is not a circular but a tabular object, a large rotating air flow, i.e., a different air flow is generated. The different air flow can thus be further strengthened for an increased strength of air flow. Also, at least one air flow separation member is arranged around the scanning mirror. In the case where a plurality of air flow separation members are provided, the plural heat generating parts existing in the apparatus can be cooled without reducing the blowing capacity. Also, air flow generating means arranged to surround the scanning mirror has an air flow inlet port at the rotation center of the scanning mirror, and therefore a higher blowing capacity is achieved.

According to the invention, filter means is arranged in the path for leading the air into the air flow inlet section of the air flow generating means around the scanning mirror and/or at the air flow inlet port in the proximity of the rotation center of the scanning mirror. In this way, dust can be removed from the air flowing into the air flow generating means, thereby maintaining the optical characteristics of the scanning mirror.

According to a still further aspect of the invention, the duct means connects the air flow inlet section and the heat generating part and has at least one bent portion. Also, a dead end is provided downstream of the bent portion in the direction of inward air flow. As a result, there is no need of providing a fabric-like filter means in the duct means for removing the dust. The operation of removing dust therefore generates substantially no flow resistance in the duct means. The long-term use thus is made possible. Dust is accumulated at the dead end and thus are prevented from flowing out under vibrations or the like phenomenon of the apparatus.

BRIEF DESCRIPTION OF THE DRAWINGS

Other and further objects, features, and advantages of the invention will be more explicit from the following detailed description taken with reference to the drawings wherein:

FIG. 5A is a simplified plan view showing a specific configuration of a scanning device 28a according to a second embodiment of the invention, and FIG. 5B a simplified side view showing a specific configuration of the scanning device 28a;

FIG. 9A is a simplified plan view showing a specific configuration of a scanning device 28e according to a sixth embodiment of the invention, and FIG. 9B a simplified side view showing a specific configuration of the scanning device 28e;

FIG. 15A is a simplified plan view showing a specific configuration around the scanning mirror 29 of a scanning device 28f, FIG. 15B a simplified plan view showing a specific configuration around the rotor 43 of the scanning device 28f, and FIG. 15C a side view of the scanning device 28f shown in FIGS. 15A and 15B according to a ninth embodiment of the invention;

DETAILED DESCRIPTION OF THE PREFERRED EMBODIMENTS

Figure 1:
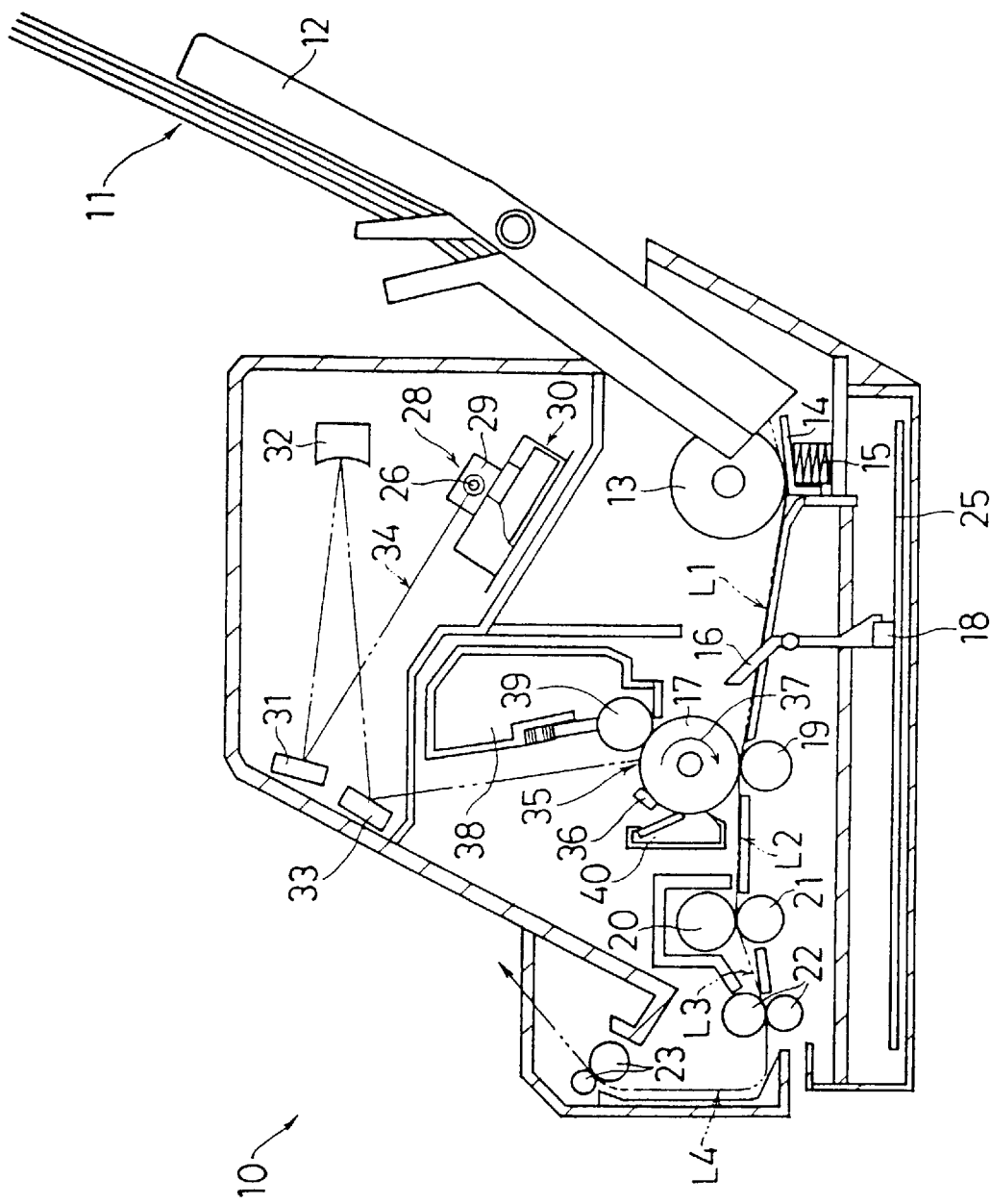
FIG. 1 is a sectional view showing a general configuration of a laser printer 10 according to a first embodiment of the invention.

Now referring to the drawings, preferred embodiments of the invention are described below.

FIG. 1 is a sectional view showing a general configuration of a laser printer 10 according to a first embodiment of the invention.

A plurality of sheets of recording paper 11 are placed on a paper feed tray 12 and are loosened as they pass between a paper feed roller 13 and a paper separation friction plate 14 pressed against the paper feed roller 13. The recording paper sheets 11 are thus fed one by one to a path L1 in a laser printer 10. The paper separation friction plate 14 is pressed against the paper feed roller 13 upward by means of a pressure spring 15.

The recording paper 11 fed into the printer 10, while felling a paper sensing pawl 16 erected midway of the path L1, is fed toward the lower part of a photosensitive member 17. When the paper sensing pawl 16 is fallen, a paper sensor 18 outputs a signal indicating the start of image printing. The paper 11 is fed by being held between the photosensitive member 17 and a transfer roller 19 arranged under the photosensitive member 17. At the same time, the toner image on the photosensitive member 17 is electrically attracted and transferred to the paper surface upward by the function of the electric field exerted by the transfer voltage applied to the transfer roller 19.

Further, the paper 11 is transported between a heat roller 20 and a pressure roller 21 of a fixing device through a path L2. The temperature of the heat roller 20 is held at one hundred and several tens of degrees Centigrade, for example. At the same time that the paper 11 is transported to a path L3 between the heat roller 20 and the pressure roller 21, the toner image on the paper 11 is supplied with a sufficient heat and pressure for the toner to fuse and solidify. As a consequence, the toner is fused, and the toner image is fixed on the paper 11 as a fast image. The paper 11 transported to the path L3 is further sent to a path L4 by means of paper transport rollers 22, 23 and delivered out of the printer 10.

The signal output from the paper sensor 18 is sent to a control circuit 25. The control circuit 25 activated by the signal from the paper sensor 18 applies an image signal generated in association with an image to be printed to a light-emitting device 26 realized with a laser diode light-emitting unit or the like. The light-emitting device 26 irradiates a laser beam in accordance with the image signal. The image signal is one for controlling the on/off operation of the light-emitting device 26 in accordance with the white or black color, for example, of the image to be printed.

A scanning mirror 29 of a scanning device 28 is rotated at a high steady speed by a motor 30 and reflects the laser beam emitted from the light-emitting device 26 in such a manner as to scan the surface of the photosensitive member 17 in the direction perpendicular to the page of the drawing. The laser beam emitted from the scanning device 28 passes through a path 34 and reflected from the reflectors 31 to 33 and scans a spot 35 on the surface of the photosensitive member 17 in the direction perpendicular to the plane in which FIG. 1 is illustrated. As a consequence, the laser beam selectively exposes the surface of the photosensitive member 17 in the direction perpendicular to the page, thereby selectively discharging the electrons on the surface of the photosensitive member 17 uniformly charged previously by a charger 36. The photosensitive member 17 is rotating in the direction of arrow 37 at a predetermined speed. Sequential repetitions of scanning operation by the laser beam in the direction of arrow 37 perpendicular to the plane in which FIG. 1 is illustrated thus forms an electrostatic latent image corresponding to the image information on the surface of the photosensitive member 17.

The toner used for development is stored in a tank, for example, of a developing device 38. The toner is appropriately agitated and charged in the developing device 38. The toner thus charged attaches to the surface of a developing roller 39, and forms a toner image corresponding to the electrostatic latent image on the photosensitive member 17 by means of the operation of the electric field generated by the developing bias voltage applied to the developing roller 39 and the surface potential of the photosensitive member 17. The toner on the photosensitive member 17 is transferred onto the recording paper 11 transported between the photosensitive member 17 and the transfer roller 19. The toner left without being transferred on the photosensitive member 17 is recovered by a remover 40 arranged downstream in the rotational direction of the photosensitive member 17. A cycle of printing operations is thus completed. The photosensitive member 17 is uniformly charged again by the charger 36 arranged down-stream of the remover 40 in the rotational direction of the photosensitive member 17, and proceeds to the next cycle of printing operations.

Figure 2A:
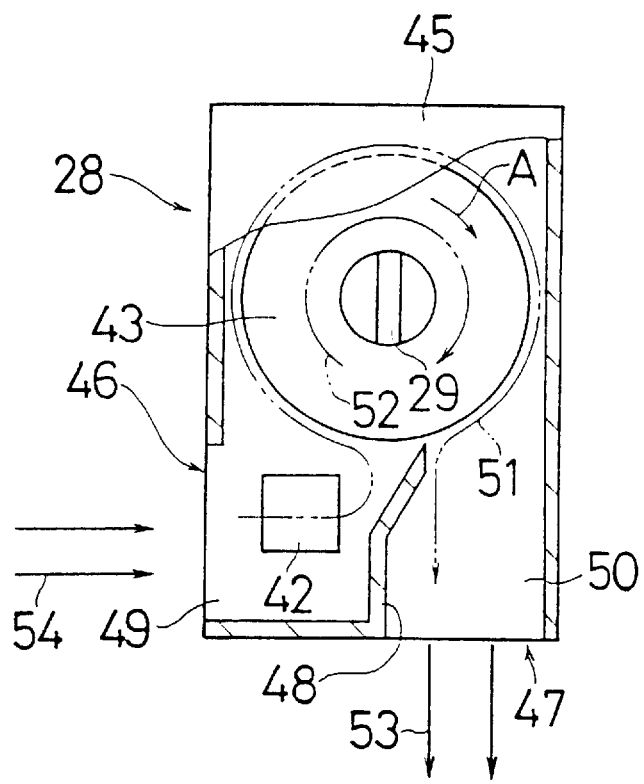
FIG. 2A is a simplified plan view showing a specific configuration of a scanning device 28 of FIG. 1, and FIG. 2B a simplified side view showing a specific configuration of the scanning device 28.
Figure 2B:
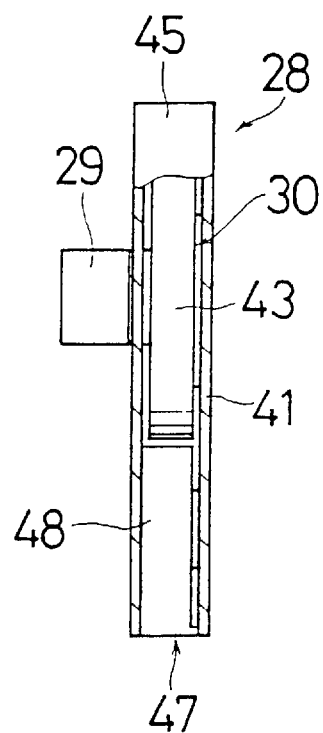

FIG. 2A is a simplified plan view showing a specific configuration of the scanning device 28 of the laser printer 10 shown in FIG. 1. FIG. 2B is a side view of the scanning device 28 shown in FIG. 2A. According to this embodiment, an air flow such as a suction air flow or a discharge air flow different from the rotating air flow generated around a rotor of the motor for rotating the scanning mirror 29 is generated by the use of the particular rotating air flow.

A base plate 41 includes a motor base and a motor drive circuit 42 formed integrally with each other. A motor 30 of an outer rotor type, for example, is arranged on the base plate 41, and the scanning mirror 29 for reflectively scanning the laser beam is mounted on the rotor 43 of the motor 30. The scanning mirror 29 is realized by a two-sided plane mirror, for example.

A cover 45 is arranged so as to confront the base plate 41, at a position where the motor rotor 43 is surrounded. The cover 45 shields the rotor 43 from the external environment. An air flow inlet port 46 and an air flow outlet port 47 are formed in the cover 45. The air flow inlet port 46 and the air flow outlet port 47 are arranged, for example, on sides of the cover 45 at right angles to each other. A tabular air flow separation member 48 is arranged in the proximity of the air flow inlet port 46 and the air flow outlet port 47. One longitudinal end of the air flow separation member 48 is close to the surface of the rotor 43, and the other longitudinal end and the lateral ends thereof are connected to the cover 45. An air flow inlet section 49 is formed in the area surrounded by the rotor 43, the air flow inlet port 46 and the air flow separation member 48 in the cover 45. Also, an air flow outlet section 50 is formed in a region surrounded by the rotor 43, the air flow outlet port 47 and the air flow separation member 48 in the cover 45. The cover 45 and the air flow separation member 48 make up an air flow generator.

The scanning mirror 29 is driven at a rotational speed of at least 6,000 rpm but not more than 20,000 rpm, for example. In the process, a rotating air flow 51 is generated around the rotor 43 and a rotating air flow 52 around the scanning mirror 29 due to the viscosity of air surrounding the rotor 43 and the scanning mirror 29 respectively.

With the rotation of the rotor 43, the rotating air flow 51 around the rotor 43 is rotated in the same direction as the rotational direction A of the rotor 43, i.e., clockwise in FIG. 2A, and thereby reaches the proximity of one longitudinal end of the air flow separation member 48. In view of the fact that one longitudinal end of the air flow separation member 48 is arranged to be close to the surface of the rotor 43 making up a rotative member, the rotating air flow 51 runs along the air flow separation member 48. As a result, the rotating air flow 51 is partially divided and discharged out of the cover 45 in the form of a discharge air flow 53 by way of the air flow outlet port 47. The partial division is defined as the fact that the rotating air flow 51 is divided into two directions including the rotational direction and the direction toward the air flow outlet port 47 by means of the air separation member 48. After the rotating air flow 51 is partially divided by the air flow separation member 48, the air pressure drops of the area around the rotor 43 and the air flow inlet section 49. In order to compensate for the air pressure drop, a suction air flow 54 is generated externally and runs into the cover 45 by way of the air flow inlet port 46. Through these steps, the discharge air flow 53 and the suction air flow 54 can be generated using the rotating air flow 51. Also, the motor drive circuit 42 heated when the motor 30 is driven can be cooled by the air flowing in by way of the air flow inlet port 46.

Figure 3:
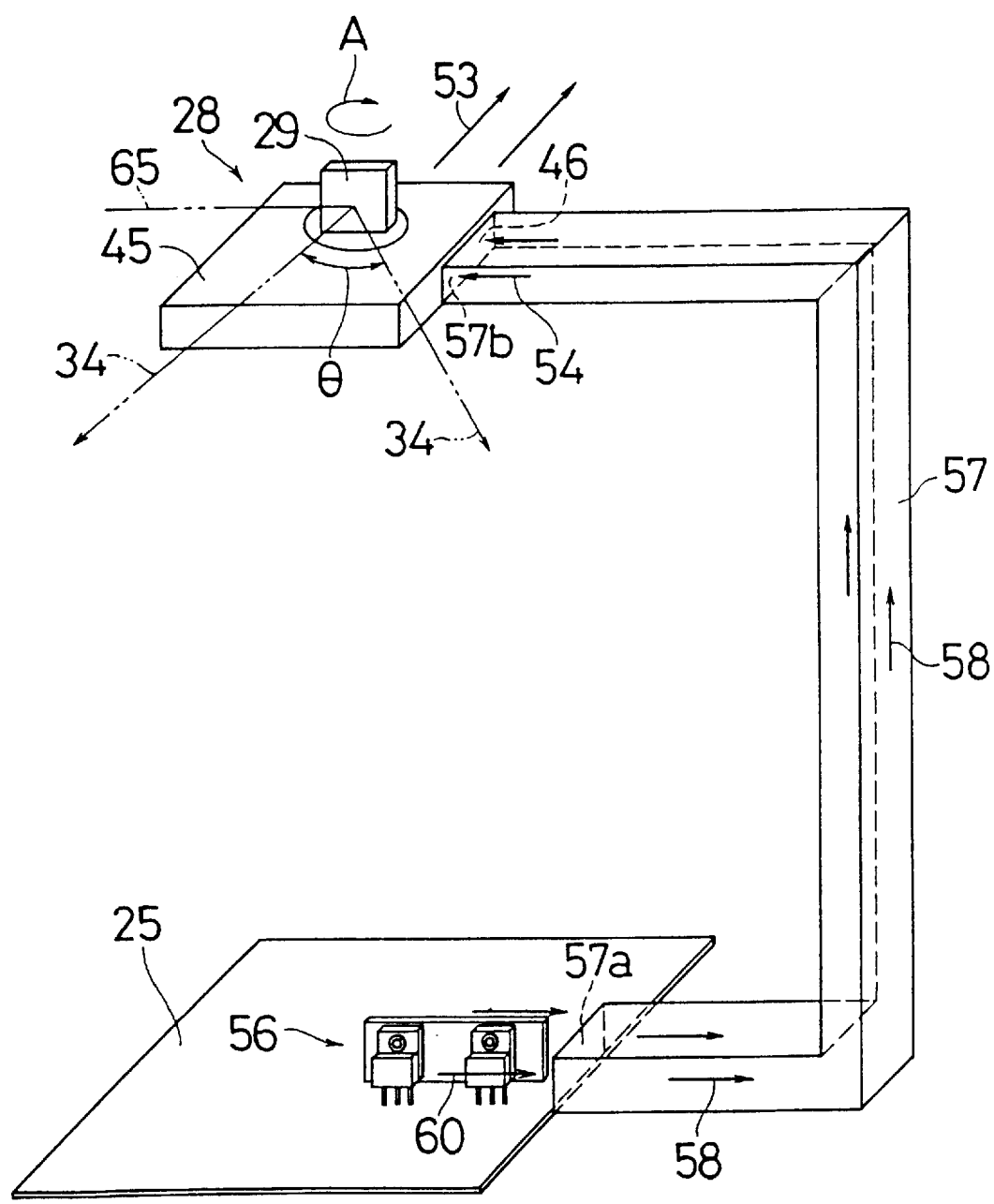
FIG. 3 is a simplified perspective view showing a specific configuration of a duct 57 with the scanning device 28 of FIG. 2 operated as a suction blower.

FIG. 3 is a simplified perspective view showing a specific configuration of a duct for cooling a distant heat-generating part using the scanning device 28 having the cover 45 as a suction blower. The scanning mirror 29 is rotated in the direction of arrow A, so that the laser beam entering the scanning device 28 through a predetermined path 65 from the light emitting device 26 is reflected in the direction of the path 34 angularly displaced in an angular range θ in sequence. The heat generating part 56 is a power transistor or the like mounted on a heat radiator on the control circuit 25, for example.

The air flow inlet port 46 of the cover 45 is connected to an outlet 57b of a tubular duct 57. An inlet 57a of the duct 57 is opened to the proximity of the heat generating part 56. The air in the proximity of the outlet 57b of the duct 57 is sucked into the cover 45 as a suction air flow 54. As a consequence, the air flow 58 in the duct 57 runs in the direction toward the outlet 57b from the inlet 57a in the proximity of the heat generating part 56, i.e., in such a direction as to be sucked into the cover 45. Consequently, the air pressure in the proximity of the inlet 57a of the duct 57 drops. In order to compensate for the air pressure drop, the air in the proximity of the heat generating part 56a is sucked into the duct 57 through the inlet 57a, thereby generating a cooling air flow 60 for cooling the heat generating part 56.

Figure 4:
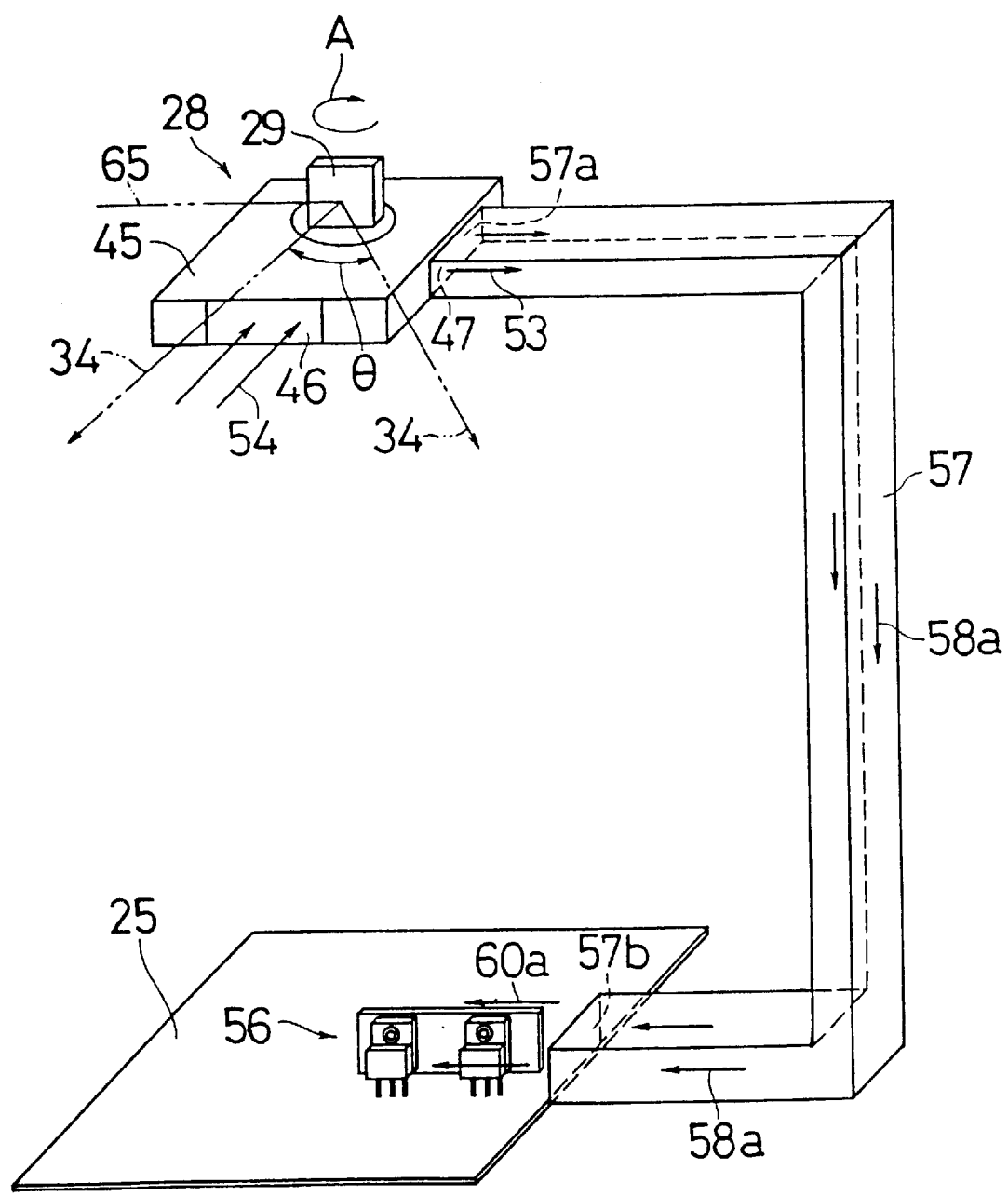
FIG. 4 is a simplified perspective view showing a specific configuration of the duct 57 with the scanning device 28 of FIG. 2 operated as an ordinary blower.

As shown in FIG. 4, the inlet 57a of the duct 57 may be connected to the air flow outlet port 47, the outlet 57b may be opened to the proximity of the heat generating part 56, and the scanning device 28 having the cover 45 may be used as a blower. In the embodiment, the discharge air flow 53 of the scanning device 28 runs into the duct 57. The air flow 58a in the duct 57, therefore, runs toward the heat generating part 56 from the scanning device 28 and is discharged as a cooling air flow 60a from the outlet 57b of the duct 57. Consequently, the cooling air flow 60a for cooling the heat generating part 56 is generated above the control circuit 25.

When the motor 30 of the scanning device 28 is activated, heat of the order of several watt is discharged generally from the driving circuit and the coils. In the case where the blowing speed is low, air may be heated when passing the proximity of the rotor 43 of the scanning device 28. In such a case, the operation of the scanning device 28 as a suction blower in the manner shown in FIG. 3 forms the cooling air flow 60 from a fresh external air or the like, thereby improving the cooling effect. In the case where the heat generating part 56 and the scanning device 28 are so distant from each other that the length of the duct 57 is considerable, on the other hand, the loss in an ordinary blower due to the flow resistance of the duct 57 is generally known to be less than the loss in a suction blower due to the same flow resistance. In such a case, a higher cooling effect is achieved by operating the scanning device 28 as an ordinary blower as shown in FIG. 4.

In this way, with the configuration shown in FIG. 3, the heated air in the proximity of the heat generating part 56 required to be cooled is sucked away, and therefore fresh air is introduced directly from the external environment into the heat generating part 56 thereby achieving a high cooling effect. This cooling effect of blowing on the heat generating part 56 is not affected by the heat generated from the driving circuit of the motor 30 or the like for the scanning mirror 29.

With the configuration of FIG. 4, the discharge air flow generally runs more harshly than the suction air flow. In the case where the air flow received from the driving circuit of the motor 30 for the scanning mirror 29 is not heated to a high degree, the overall cooling effect considering the blowing rate and the air temperature can be increased.

According to this embodiment, the rotating air flow 52 around the scanning mirror 29 is not used. Therefore, the scanning mirror 29 is not adversely affected by attachment of dust thereto or otherwise, thereby making it possible to maintain the reliability of the optical system.

FIG. 5A is a simplified plan view showing a specific configuration of a scanning device 28a according to a second embodiment of the invention. FIG. 5B is a side view showing the scanning device 28a of FIG. 5A. The laser printer according to this embodiment has a similar configuration to the laser printer of FIG. 1, and uses the scanning device 28a in place of the scanning device 28. According to this embodiment, the discharge air flow 53 and the suction air flow 54 are generated by the use of the rotating air flow 52 around the scanning mirror 29. The scanning device 28a has a configuration similar to the scanning device 28. Therefore, the component parts of the scanning device 28a, which are identical to those of the scanning device 28, are designated by the same reference numerals as the corresponding parts of the scanning device 28 respectively and will not be described any further.

A cover 61 surrounding the scanning mirror 29 is arranged at a position opposed to the base plate 41 of the scanning device 28a. The cover 61 is used to mask the scanning mirror 29 and the surrounding thereof from the external environment. An air flow inlet port 46 and an air flow outlet port 47 are formed on sides of the cover 61. The space in the proximity of the air flow inlet port 46 and the air flow outlet port 47 is divided by a tabular air flow separation member 64, thereby forming an air flow inlet section 49 and an air flow outlet section 50. One longitudinal end of an air flow separation member 64 is close to the scanning mirror 29, and the other longitudinal end and the lateral ends thereof are connected to the cover 61.

The sides of the cover 61 opposed to the sides having the air flow outlet port 47 and the air flow inlet port 46, respectively, are translucent, and form a laser entrance window 62 and a laser exit window 63, respectively. The laser beam emitted from the light emitting device 26 enters the cover 61 by way of the laser entrance window 62 along the path 65, and is reflected on the scanning mirror 29. Then the laser beam exits through the laser exit window 63 along the path 34, whose direction is changed to an arbitrary direction. As a result, even if the scanning mirror 29 is covered by the cover 61, the scanning of the laser beam is not affected.

The rotating air flow 52 generated around the scanning mirror 29 is partially divided by the air flow separation member 64 and is discharged out of the cover 61 as a discharge air flow 53 from the air flow outlet port 47. The air pressure at the air flow inlet section 49 thus drops, and in order to compensate for the air pressure drop, a suction air flow 54 is generated and runs into the cover 61 by way of the air flow inlet port 46. In this way, the discharge air flow 53 and the suction air flow 54 are generated.

The scanning mirror 29 is tabular in shape, for example, and therefore the rotating air flow 52 generated around the scanning mirror 29 runs at higher rate than the rotating air flow 51 around the rotor 43 of the motor 30 having a cross section of true circle. Consequently, the blowing capacity can be improved.

The scanning mirror 29 is included in an optical system having a reflector, a light emitting device and a scanning device of the laser printer. In a general laser printer, the protracted use of the printer causes the dust intruding from outside of the printer, the paper dust of the recording paper, the toner flying from the developing device 38 to be accumulated in the printer. The dust is a cause of disturbing the optical system. In the case where dust attaches to the scanning mirror 29, for example, the spot formation on the photosensitive member may be adversely affected. This effect significantly presents itself in the laser printer for performing high-resolution printing such as 600 DPI (dots per inch) or 1,200 DPI.

In the case where the scanning device 28a is connected to a duct having the same configuration as the one shown in FIGS. 3 and 4, a filter is provided in the air flow inlet path for removing the dust, thereby preventing dust from intruding into the proximity of the scanning mirror 29. The filter, which is made of a fabric, for example, is arranged in the air flow inlet port 46 or the duct 57 in the case where the scanning device 28a is used as a suction blower as shown in FIG. 3. In the case where the scanning device 28a is used as an ordinary blower as shown in FIG. 4, on the other hand, the filter is arranged in the air flow inlet path communicating with the air flow inlet port 46 or the air flow inlet port 46. As a result, dust can be prevented from intruding into the proximity of the scanning mirror, and the printing reliability can thus be secured especially when the present embodiment is applied to a high-resolution printer.

Figure 6A:
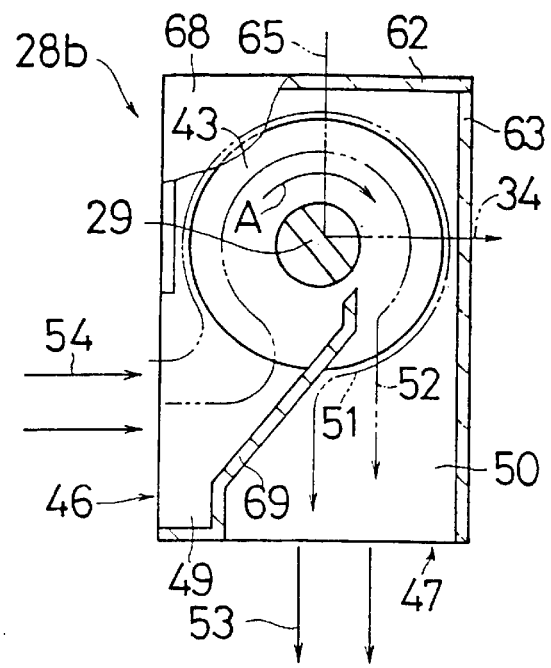
FIG. 6A is a simplified plan view showing a specific configuration of a scanning device 28b according to a third embodiment of the invention, and FIG. 6B a simplified side view showing a specific configuration of the scanning device 28b.
Figure 6B:
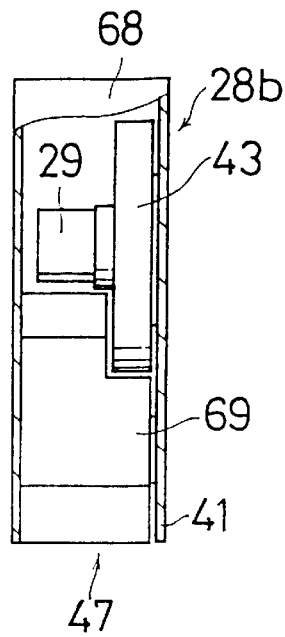

FIG. 6A is a simplified plan view showing a specific configuration of a scanning device 28b according to a third embodiment of the invention. FIG. 6B is a side view showing the scanning device 28b of FIG. 6A. The laser printer according to the embodiment under consideration has a configuration similar to the laser printer of FIG. 1 and uses the scanning device 28b in place of the scanning device 28. According to this embodiment, the rotating air flow 51 around the rotor 43 and the rotating air flow 52 around the scanning mirror 29 are both utilized to generate a discharge air flow 53 and a suction air flow 54. The scanning device 28b has a similar configuration to the scanning devices 28, 28a, and the same component parts thereof designated by the same reference numerals as the corresponding parts of the scanning devices 28, 28a respectively will not be described any further.

A cover 68 for surrounding the rotor 43 of the motor 30 and the scanning mirror 29 is arranged at a position opposed to the base plate 41. The cover 68 shuts off the scanning mirror 29 and the rotor 43 from the external environment. The cover 68 has an air flow inlet port 46, an air flow outlet port 47, a laser entrance window 62 and a laser exit window 63. A part of one longitudinal end of a tabular air flow separation member 69 is close to the scanning mirror 29, and another part thereof is close to the rotor 43. Also, the other longitudinal end and the lateral ends of the air flow separation member 69 are connected to the cover 68. The space in the proximity of the air flow inlet port 46 and the air flow outlet port 47 is split by the air flow separation member 69 and forms the air flow inlet section 49 and the air flow outlet section 50.

The rotating air flow 51 around the rotor 43 and the rotating air flow 52 around the scanning mirror 29 are both partially divided in the proximity of a longitudinal end of the air flow separation member 69 and is released outside of the cover 68 as a discharge air flow 53 from the air flow outlet port 47. In this way, the air pressure of the air flow inlet section 49 in the cover 68 drops, and in order to compensate for this air pressure drop, a suction air flow 54 is generated and runs into the cover 68 by way of the air flow inlet port 46. The discharge air flow 53 and the suction air flow 54 are thus generated.

As described above, the use of the rotating air flow 51 around the rotor and the rotating air flow 52 around the scanning mirror strengthens the discharge air flow 53 and the suction air flow 54 generated. Consequently, a higher blowing capacity is obtained.

Figure 7A:
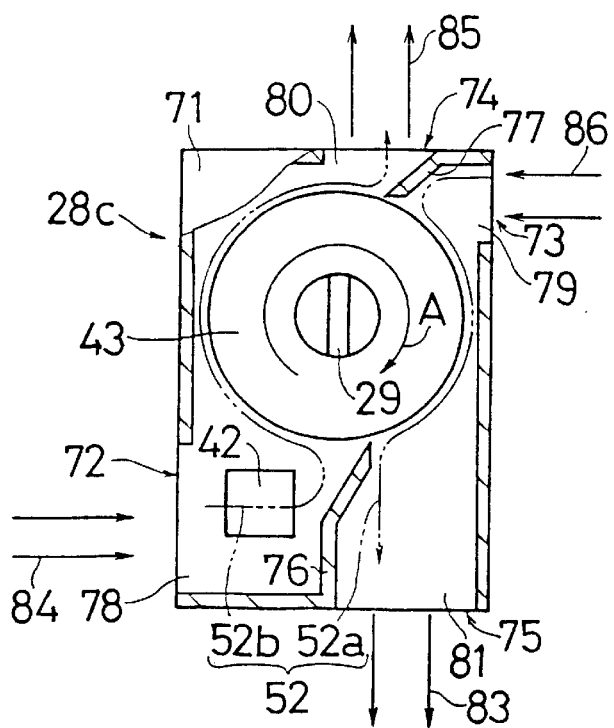
FIG. 7A is a simplified plan view showing a specific configuration of a scanning device 28c according to a fourth embodiment of the invention, and FIG. 7B a simplified side view showing a specific configuration of the scanning device 28c.
Figure 7B:
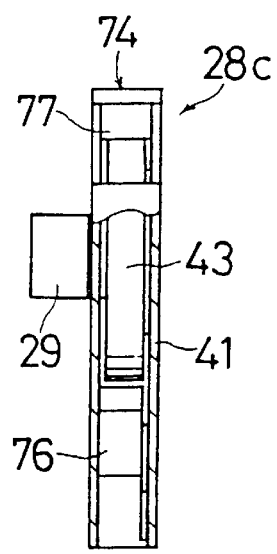

FIG. 7A is a simplified plan view showing a specific configuration of the scanning device 28c according to a fourth embodiment of the invention. FIG. 7B is a side view of the scanning device 28c of FIG. 7A. The laser printer according to this embodiment has a configuration similar to the laser printer of FIG. 1 and uses the scanning device 28c in place of the scanning device 28. According to this embodiment, the discharge air flow and the suction air flow are generated in two routes respectively by the use of the rotating air flow 51 of the scanning device 28c. The scanning device 28c has a configuration similar to the scanning device 28. Therefore, the component parts of the scanning device 28c, which are identical to those of the scanning device 28, are designated by the same reference numerals as the corresponding parts of the scanning device 28 respectively and will not be described any further.

A box-like cover 71 surrounding the rotor 43 is arranged at a position opposed to the base plate 41. Air flow inlet ports 72, 73 and air flow outlet ports 74, 75 are arranged on sides of the cover 71. More specifically, the air flow inlet ports 72, 73 are arranged on opposed sides of the cover 71, respectively, and the air flow outlet ports 74, 75 are arranged on opposed sides of the cover 71. The sides where the air flow inlet ports 72, 73 are arranged are orthogonal to the sides where the air flow outlet ports 74, 75 are arranged.

One longitudinal end of each of tabular air flow separation members 76, 77 is close to the rotor 43, and the other longitudinal end and the lateral ends thereof are connected to the cover 71. The other longitudinal end of the air flow separation member 76 is connected, for example, to the side provided with the air flow outlet port 75. The other longitudinal end of the air flow separation member 77, on the other hand, is connected to the side formed with the air flow outlet port 74.

The rotating air flow 52a around the rotor 43 runs in the direction of arrow A in accordance with the rotation of the rotor 43. When reaching the air flow separation member 76, the rotating air flow 52a is partially divided and released as a discharge air flow 83 to the outside of the cover 71 from the air flow outlet port 75. As a result, the suction air flow 84 runs from the air flow inlet port 72 into the surrounding of the rotor 43 which is now at a negative pressure, and forms the rotating air flow 52b around the rotor. The rotating air flow 52b runs in the direction of arrow A in accordance with the rotation of the rotor 43. When reaching the air flow separation member 77, the rotating air flow 52b is partially divided. The resulting air flow is discharged from the air flow outlet port 74 as a discharge air flow 85. The partial division of the rotating air flow 52b by the air flow separation member 77 causes the suction air flow 86 to run from the air flow inlet port 73 into the surrounding of the rotor 43 which is now at a negative pressure. This air forms the rotating air flow 52a running with the rotation of the rotor and reaching the air flow separation member 76.

Figure 8A:
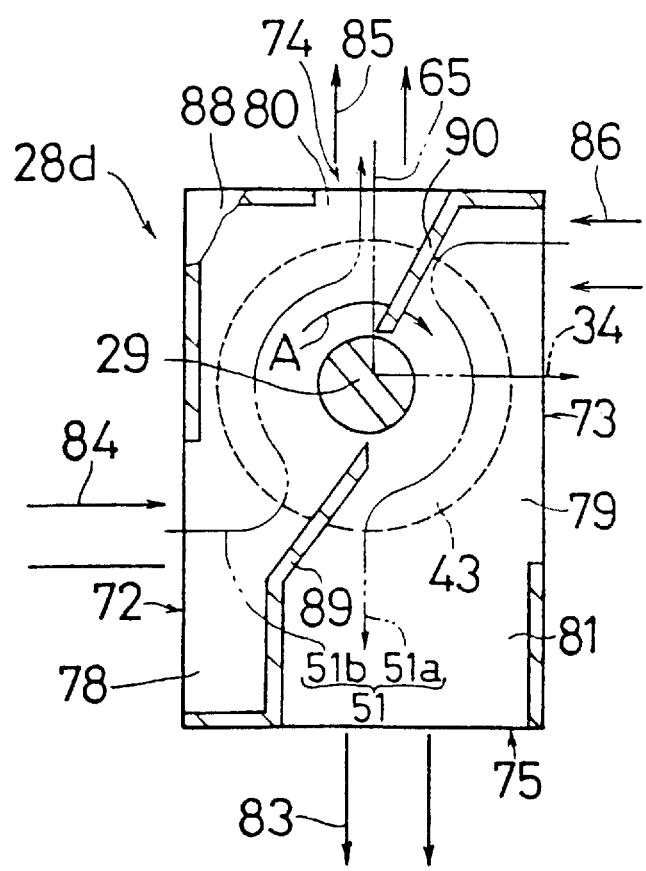
FIG. 8A is a simplified plan view showing a specific configuration of a scanning device 28d according to a fifth embodiment, and FIG. 8B a simplified side view showing a specific configuration of the scanning device 28d.
Figure 8B:
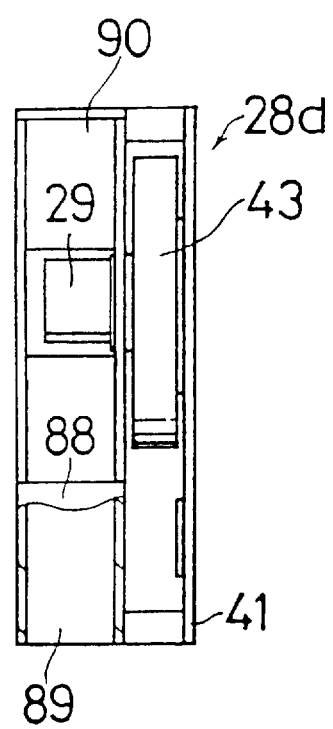

FIG. 8A is a simplified plan view showing a specific configuration of a scanning device 28d according to a fifth embodiment of the invention. FIG. 8B is a side view showing the scanning device 28d of FIG. 8A. The laser printer of the embodiment has a configuration similar to the laser printer shown in FIG. 1 and uses the scanning device 28d in place of the scanning device 28. According to this embodiment, a discharge air flow and a suction air flow are generated in two routes respectively by the use of the rotating air flow 52 around the scanning mirror 29 of the scanning device 28d. The scanning device 28d has a configuration similar to the scanning devices 28a, 28c. Therefore, the component parts of the scanning device 28d, which are identical to those of the scanning devices 28a, 28c, are designated by the same reference numerals as the corresponding parts of the scanning devices 28a, 28c respectively and will not be described any further.

A box-like cover 88 surrounding the scanning mirror 29 is arranged at a position opposed to the base plate 41. The cover 88 has air flow inlet ports 72, 73 and air flow outlet ports 74, 75. One longitudinal end of each air flow separation member 89, 90 is close to the scanning mirror 29 and the other longitudinal end and the lateral ends of each air flow separation member 89, 90 are connected to the cover 88. The other longitudinal end of the air flow separation member 89 is connected to the side of the cover 88 having the air flow outlet port 75. The other longitudinal end of the air flow separation member 90 is connected to the side of the cover 88 having the air flow outlet port 74.

The space in the proximity of the air flow inlet port 72 and the air flow outlet port 75 is partitioned by the air flow separation member 89 into an air flow inlet section 78 and an air flow outlet section 81. The space in the proximity of the air flow inlet 73 and the air flow outlet 74, on the other hand, is split by the air flow separation member 90 to form an air flow inlet section 79 and an air flow outlet section 80.

The laser beam irradiated from the light-emitting device 26 enters the interior of the cover 88 from the air flow inlet port 74 along the path 65, is reflected on the scanning mirror 29, and exits along the path 34 by way of the air flow inlet port 73. The air flow inlet port 73 is formed larger than the range of angular displacement of the path 34. The duct connected to the air flow inlet port 73 and the air flow outlet port 74 is formed of a translucent material, for example, not to adversely affect the passage of the laser beam. The air flow separation member 90 is arranged at such a position as not to block the path 65 of the laser beam.

The rotating air flow 51a around the scanning mirror 29, reaching the air flow separation member 89, is partially split into a discharge air flow 83, which is discharged out of the cover 88 by way of the air flow outlet port 75. As a result, the suction air flow 84 runs in the cover 88 by way of the air flow inlet port 72 into the surrounding of the scanning mirror 29 which is now negative in pressure, thus making up the rotating air flow 51b around the scanning mirror 29. The rotating air flow 51b runs in the direction of arrow A and reaches the air flow separation member 90 with the rotation of the scanning mirror 29. The rotating air flow 51b that has thus reached the air flow separation member 90 is partially divided and discharged out of the cover 88 in the form of the partially divided discharge air flow 85 by way of the air flow outlet port 74. The suction air flow 86 runs from the air flow inlet port 73 into the surrounding of the scanning mirror 29 which has been partially divided by the air flow separation member 90 and is now negative in pressure. With the rotation of the scanning mirror 29, this suction air flow 86 flows in the direction of arrow A and reaches the air flow separation member 89.

As shown with reference to the fourth and fifth embodiments, provision of two air flow separation members around the rotor 43 or the scanning mirror 29 can produce a discharge air flow and a suction air flow in two routes, respectively. The two routes of air flow are each introduced to a duct. In the case where the printer has two heat generating parts, a stronger air flow is obtained than when a single route of air flow is led separately to each heat generating part.

FIG. 9A is a simplified plan view showing a specific configuration of a scanning device 28e according to a sixth embodiment of the invention. FIG. 9B is a side view of the scanning device 28e of FIG. 9A. The laser printer according to this embodiment has a configuration similar to the laser printer of FIG. 1 and uses the scanning device 28e in place of the scanning device 28. The scanning device 28e has a configuration similar to the scanning device 28d. Therefore, the component parts of the scanning device 28e, which are identical to those of the scanning device 28d, are designated by the same reference numerals as the corresponding parts of the scanning device 28d respectively and will not be described any further.

Generally, a rotating air flow exists around an object rotating at high speed. Such a rotating air flow tends to flow outward of the rotation center due to the centrifugal force exerted on the mass of the air particles. In the case where an opening is present at the rotation center, therefore, external air is taken in by way of the opening. According to this embodiment, an opening is formed as an air flow inlet port in the cover 88 of the scanning device 28e of FIG. 8 to strengthen the rotating air flow 51 in the cover 88.

An opening 91 circular in shape, for example, is formed at the portion of the cover 88 covering the upper part of the scanning mirror 29. The rotating air flow 51b around the scanning mirror 29 is discharged out of the air flow outlet port 74 as a partially divided flow, thereby reducing the pressure to negative in the cover 88. The suction air flow 86 then runs into the cover 88 by way of the air flow inlet port 73. At the same time, the suction air flow 92 flows into the cover 88 from the opening 91, and forms a rotating air flow 51a jointly with the suction air flow 86. The blowing capacity of the scanning device 28e can be further improved in this way. Also, a filter or the like may be provided at the opening 91 in order to block dust intruding into the cover 88.

Figure 10:
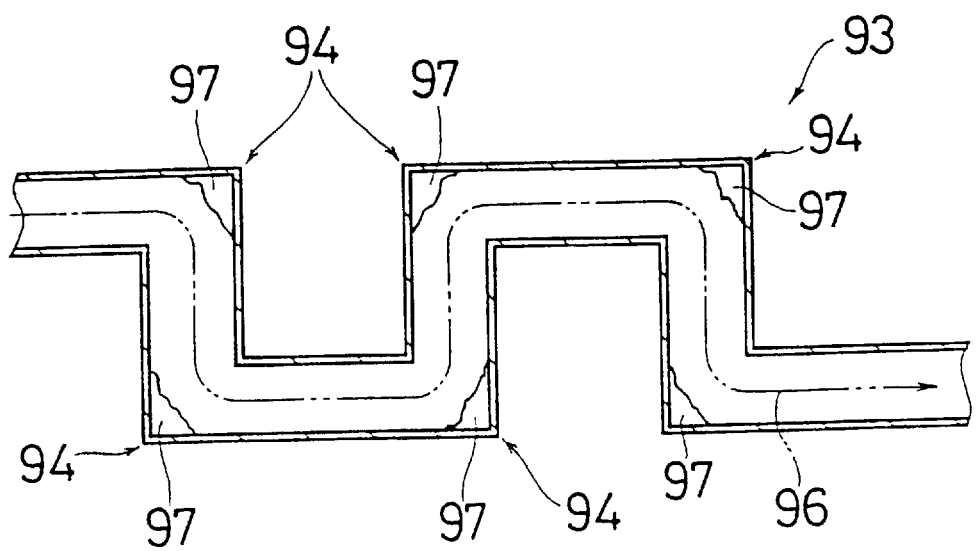
FIG. 10 is a horizontal sectional view showing a duct 93 according to a seventh embodiment of the invention.

FIG. 10 is a horizontal plan view showing a duct 93 according to a seventh embodiment of the invention. The laser printer according to this embodiment has a configuration similar to the laser printer of FIG. 1. A filter for removing dust, which may be provided at the air flow inlet port of the cover of the scanning device or within the duct, is clogged with the accumulation of dust and increase of flow resistance is caused. For this reason, the long-term use of the laser printer requires replacement or cleaning of the filter. According to this embodiment, the duct 93 is bent in horizontal direction to form at least a bent portion 94 constituting a dust remover which can remove dust free of clogging for a long time without any filter.

Figure 11:
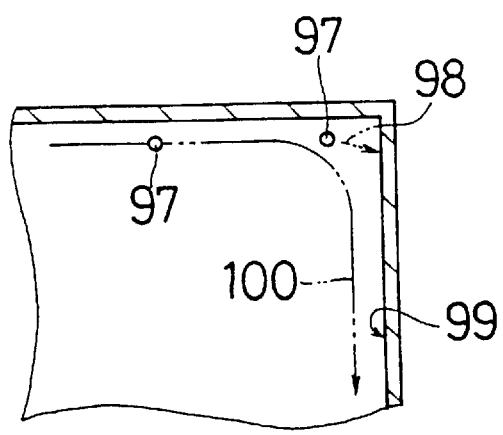
FIG. 11 is an enlarged view of a bent portion 94 of the duct 93 shown in FIG. 10.

A in-duct air flow containing dust flows in the duct 93 having a plurality of bent portions 94 in the direction of arrow 96. FIG. 11 is an enlarged view of the bent portion 94. In the case where the in-duct air flow containing dust changes the direction at the bent portion 94, dust particles 97 having a density 10 to 100 times higher than the air particles advance in the direction of arrow 98 away from the direction of air flow under the inertial force exerted on the mass of the dust particles 97. The dust then bombards the wall 99 of the duct 93, drops and accumulates. In this way, the dust particles 97 are removed from the in-duct air flow, and the resulting air flows in the direction of arrow 100 along the wall 99. The dust particles 97 are accumulated downward of the bent portion 94. Accumulation of dust at the bent portion 94 in the duct 93 does not cause a large flow resistance.

Figure 12:
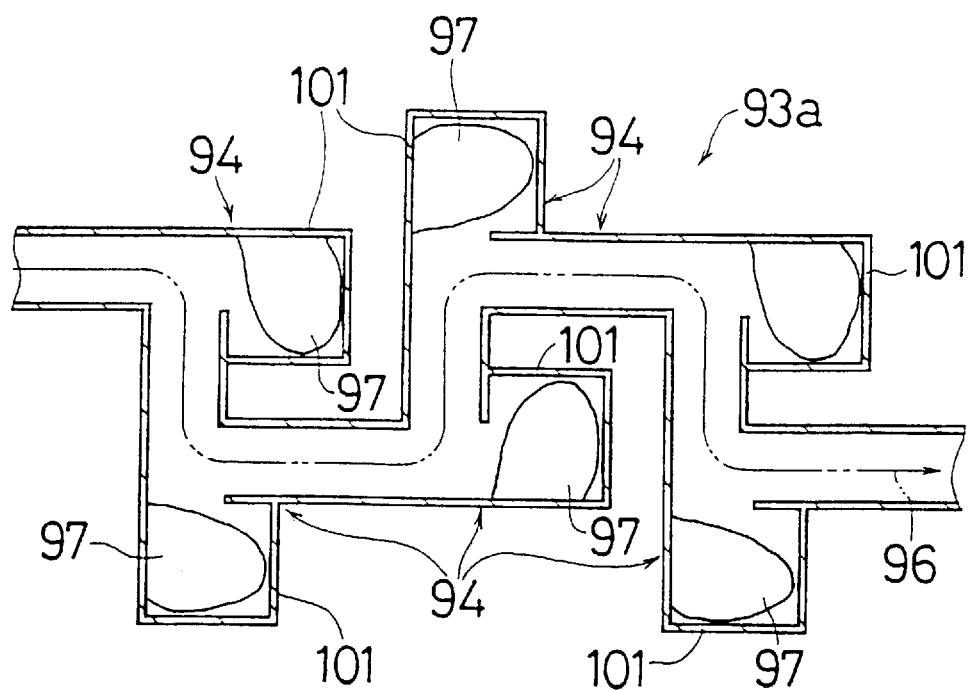
FIG. 12 is a horizontal sectional view of a duct 93a according to an eighth embodiment of the invention.

FIG. 12 is a horizontal sectional view showing a duct 93a according to an eighth embodiment of the invention. The laser printer according to this embodiment has a configuration similar to the laser printer of FIG. 1. The duct 93a has a configuration similar to the duct 93. Therefore the component parts of the duct 93a, which are identical to those of the duct 93, are designated by the same reference numerals as the corresponding parts of the duct 93 respectively and will not be described any further. According to this embodiment, a dead end 101 for accumulating dust is formed at each of the bent portions 94.

The dead end 101 is formed in the wall of the bent portion 94 downstream in the direction of in-duct air flow, i.e., in the wall bombarded by the dust particles 97. The dust particles 97, which tend to advance straight ahead at the bent portion, enter the dead end 101 away from the air flow, drop and accumulate as they bombard the deep wall of the dead end 101. In this way, the dust particles 97 are prevented from being rescattered in the duct 93a under a shock or the like.

Figure 13A:
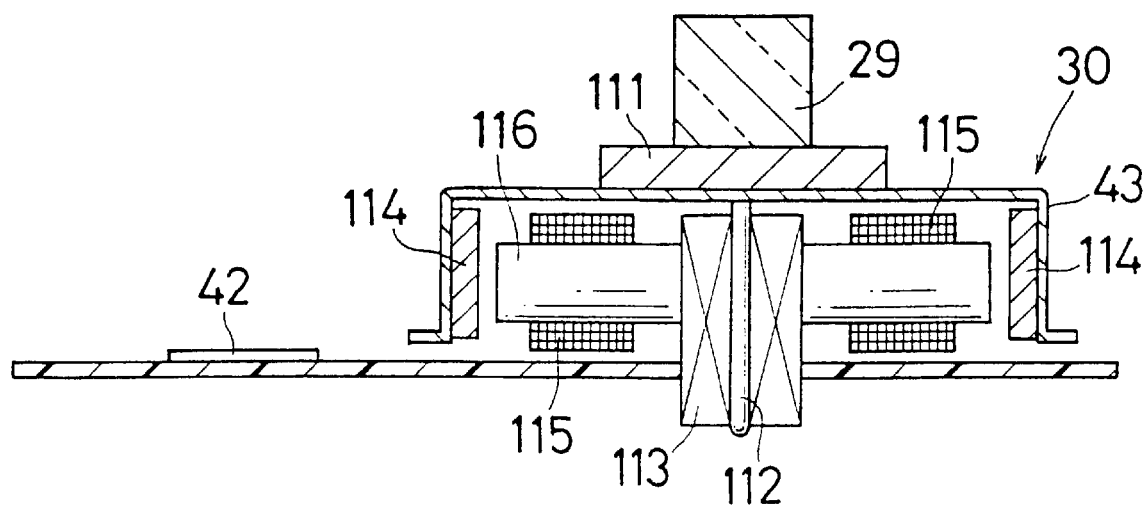
FIG. 13A is a sectional view of a motor having a rotor 43 and a scanning mirror 29 of the scanning device 28c of FIG. 7 used in a verification test, and FIG. 13B a perspective view of the scanning mirror 29.
Figure 13B:
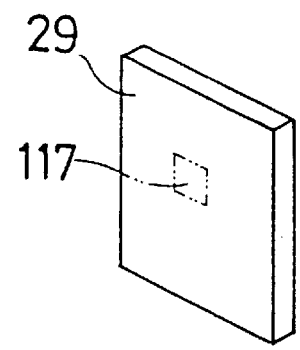

A verification test for confirming the blowing performance was conducted using the scanning device 28c according to the fourth embodiment. FIG. 13A is a sectional view of the scanning mirror 29 and the motor 30 for explaining a motor structure having the rotor 43 of the scanning device 28c used for the test. FIG. 13B is a perspective view showing the scanning mirror 29.

The scanning mirror 29 making up a tabular glass mirror of the scanning device 28c is fixed on a mirror fixing rest 111, which in turn is mounted on the rotor 43 of the motor 30. The rotor 43 is formed in the shape of a circular cup, and a rotary shaft 112 is supported on a bearing 113 in such a manner as to position the circular cup with the opening down. The rotor 43, which is formed of a pressed iron metal plate, is mounted so that a plurality of magnets 114 with different polarities are arranged on the inner side of the rotor 43 in the diametric direction. For the bearing 113 is fixedly arranged a stator 116 wound with a driving coil 115 for driving the motor 30.

When a predetermined current is supplied to the driving coil 115, a Lorentz's force is generated by the same current and the magnetic field caused by the magnets 114, and the rotor 43 thus begins to rotate. This in turn rotates the scanning mirror 29. The scanning mirror 29 also reflects the laser beam on a mirror face 117 formed on the surface thereof.

The rotor 43 of this motor 30 is covered with a cover 71 shown in FIG. 7A to recover the discharge air flow and the suction air flow. The air flow separation members 76, 77 of the cover 71 are a tabular member formed of a 1 mm thick plastic plate. The distance between the surface of the rotor 43 and the one end of each air flow separation member 76, 77 is set to about 0.5 mm.

A linear duct is mounted on the air flow outlet ports 74, 75 of the scanning device 28c. The sectional area of the duct is about double the sectional area of the air flow outlet ports 74, 75. A hot-wire anemometer is provided to measure the velocity of in-duct air flow at a distance of about 50 cm from the connection with the air flow outlet ports 74, 75 in the duct, i.e., a portion where the in-duct air flow settles. In the process, the rotational speed of the motor 30 is assumed to be 1800 rpm.

The velocity of the discharge air flow from the scanning device 28c was measured using the devices described above and the blowing capacity of the scanning device 28c was calculated. As a result, the blowing capacity of the scanning device 28c was found to be 1.7 times higher than that of the scanning device 28a shown in FIG. 2. Provision of a plurality of air flow output ports, therefore, improves the blowing capacity and permits a highly efficient cooling of the heat generating parts as compared with the provision of a single air flow output port.

Figure 14:
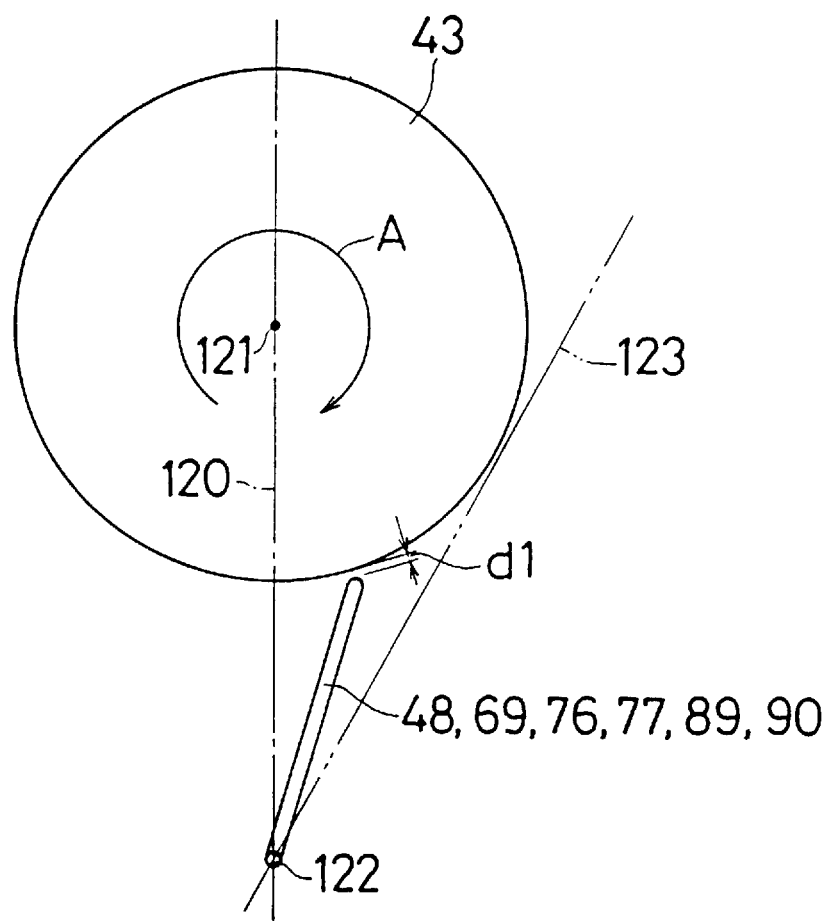
FIG. 14 is a model diagram showing a rotor 43 and air flow separation members 48, 69, 76, 77, 89, 90 for explaining the preferable conditions of the structure of the scanning devices 28, 28a to 28e.

For the scanning devices 28, 28a to 28e according to the invention to produce an efficient blowing capacity, it is desirable to meet the following conditions. FIG. 14 is a model diagram of the rotor 43 and the air flow separation members 48, 69, 76, 77, 89, 90 for explaining such conditions.

It is preferable that the rotational speed of the rotor 43 is 5000 rpm or more, and the more, the more preferable. Additionally, it is preferable that the distance d1 between the one end of the air flow separation member and the surface of the rotor 43 is 1 mm or less, and the less, the more preferable.

Further, it is preferable that each air flow separation member is arranged so that the one end thereof is positioned between the central axis 120 passing through the rotation center 121 of the rotor 43 and the other end 122 thereof, and a tangential line 123 passing through the other end 122 and in contact with the outer periphery of the rotor 43 upstream in the direction A of rotation of the rotor 43 on the other hand.

The air flow separation member is arranged and the rotation of the rotor 43 is set in a manner to meet the aforementioned conditions, whereby the velocity of the air generated by the scanning devices 28, 28a to 28e can be increased for an improved blowing capacity.

FIG. 15A is a simplified plan view showing a specific configuration of the surrounding of the scanning mirror 29 of a scanning device 28f according to a ninth embodiment of the invention. FIG. 15B is a simplified plan view showing a specific configuration of the surrounding of the rotor 43 of the scanning device 28f. FIG. 15C is a side view of the scanning device 28f shown in FIGS. 15A and 15B.

The laser printer according to this embodiment has a configuration similar to the laser printer of FIG. 1, and uses the scanning device 28f in place of the scanning device 28. According to this embodiment, the discharge air flow 85 and the suction air flow 84 are generated by taking advantage of the rotating air flow 51 around the scanning mirror 29. Also, the discharge air flow 53 and the suction air flow 54 are generated by taking advantage of the rotating air flow 51 around the rotor 43. The scanning device 28f has a configuration similar to the scanning devices 28, 28d. Therefore, the component parts of the scanning device 28f, which are identical to those of the scanning devices 28, 28d, are designated by the same reference numerals as the corresponding parts of the scanning devices 28, 28d respectively and will not be described any further.

With reference to FIG. 15A, a box-like cover 88 is arranged at a position opposed to the base plate 41 as to surround the scanning mirror 29. The cover 88 includes an air flow inlet 72 and an air flow output port 74. One longitudinal end of each tabular air flow separation member 189, 190 is close to the scanning mirror 29, and the other longitudinal end and the lateral ends of each air flow separation member 189, 190 are connected to the cover 88. More specifically, the other longitudinal end of the air flow separation member 190 is connected to the side of the cover 88 having the air flow output port 74. The other longitudinal end of the air flow separation member 189 is connected to the side of the cover 88 opposed to the side where the other end of the air flow separation member 190 is connected. The longitudinal ends of the air flow separation members 189, 190, which are close to the scanning mirror 29, are conjoined with each other by an arcuate member 200 in the proximity of the scanning mirror 29. The arcuate member 200 has the same shape as a part of the side wall of a cylinder having a radius larger than the rotational radius of the scanning mirror 29. The cover 88 surrounding the scanning mirror 29, the air flow separation members 189, 190 and the arcuate member 200 are made of a translucent material not to block the laser beam irradiated from the light-emitting device 26 and the laser beam reflected from the scanning mirror 29.

The space surrounded by the cover 88 is partitioned by the air flow separation members 189, 190 and an arcuate member 200 into a space where the scanning mirror 29 is arranged and the rotating air flow 52 is generated around the scanning mirror 29 and a space where the scanning mirror 29 is not arranged and the rotating air flow 52 is not generated.

The rotating air flow 52 around the scanning mirror 29, which reaches the air flow separation member 190 and loses the way, is discharged out of the cover 88 from the air flow output port 75 in the form of the discharge air flow 85. As a result, the suction air flow 84 enters the interior of the cover 88 by way of the air flow inlet port 72 into the surrounding of the scanning mirror 29 which is now negative in pressure. With the rotation of the scanning mirror 29, the suction air flow 84 runs in the direction of arrow A, and reaching the air flow separation member 190, makes up the discharge air flow 85.

By referring to FIG. 15B, a box-like cover 45 is arranged at a position opposed to the base plate 41 as to surround the rotor 43. The cover 45 includes an air flow inlet port 46 and an air flow outlet port 47. One longitudinal end of the air flow separation member 48 is arranged to be close to the rotor 43, while the other longitudinal end and the lateral ends thereof are connected to the cover 45. The other longitudinal end of the air flow separation member 48 is connected to the side of the cover 45 having the air flow outlet port 47.

The rotating air flow 51 around the rotor 43 reaching the air flow separation member 48 is partially divided into a discharge air flow 53, which is discharged out of the cover 45 by way of the air flow outlet port 47. Consequently, the suction air flow 54 runs inside of the cover 45 from the air flow inlet port 46 into the surrounding of the rotor 43 which is now negative in pressure. With the rotation of the rotor 43, the suction air flow 54 runs in the direction of arrow A, and reaching the air flow separation member 48, is partially divided into the discharge air flow 53.

As shown in FIG. 15C, the cover 45 surrounding the rotor 43 is arranged at a position opposed to the base plate 41, with the upper cover 88 being arranged to surround the scanning mirror 29. In the space defined by the cover 88, as explained with reference to FIG. 15A, the rotating air flow 52 around the scanning mirror 29 reaches the air flow separation member 190 and is discharged from the air flow outlet port 75 as a discharge air flow 85. In the space defined by the cover 45, on the other hand, as explained with reference to FIG. 15B, the rotating air flow 51 around the rotor 43 reaching the air flow separation member 48 is partially divided and discharged from the air flow outlet port 47 as a discharge air flow 53. In this way, a discharge air flow and a suction air flow are obtained in two routes respectively for the scanning device 28f. The discharge air flow 85 released from the cover 88, for example, is led through a duct to a heat generating part provided with a power transformer, while the discharge air flow 53 released from the cover 45 is introduced through a duct to heat generating parts like the power transistor on the control circuit 25.

A blowing performance test was conducted using the scanning device 28f according to the ninth embodiment described above. The blowing performance depends on the mounting position of the air flow separation members 189, 190, 48 shown in FIGS. 15A and 15B. In the case where the air flow separation members 189, 190, 48 are not mounted in position, the air required for cooling the heat generating parts cannot be obtained. Even in the case where the air required for cooling the heat generating parts can be obtained, a large noise occurs due to the wind-breaking sound of the air flow. This test was conducted to detect the optimum mounting position of the air flow separation members 189, 190, 48 for securing sufficient blowing.

Figure 16A:
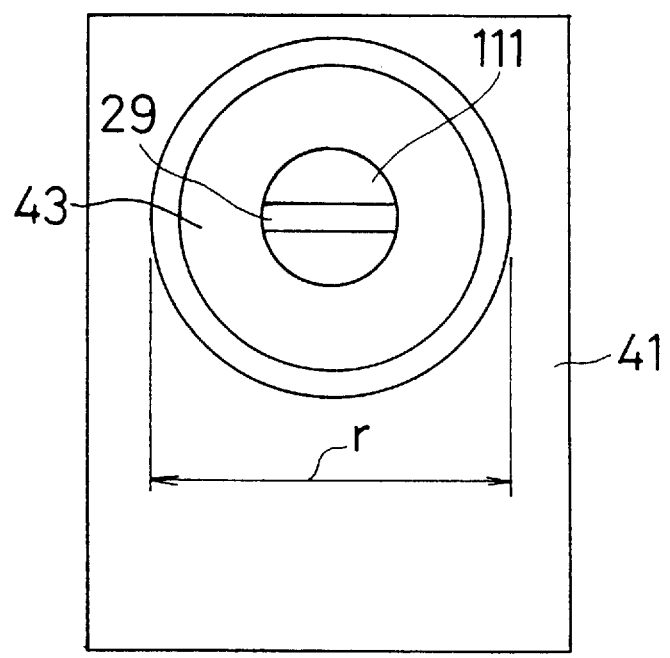
FIG. 16A is a plan view showing the rotor 43 and the scanning mirror 29 used for conducting a test with the configuration of FIGS. 15A to 15C, and FIG. 16B a side view showing the rotor 43 and the scanning mirror 29 of FIG. 16A.
Figure 16B:
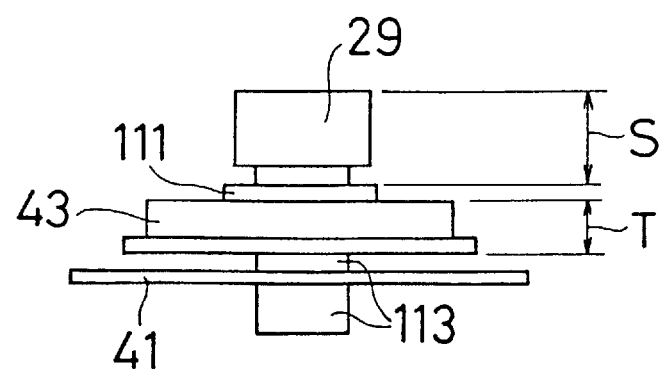
Figures 17A, 17B:
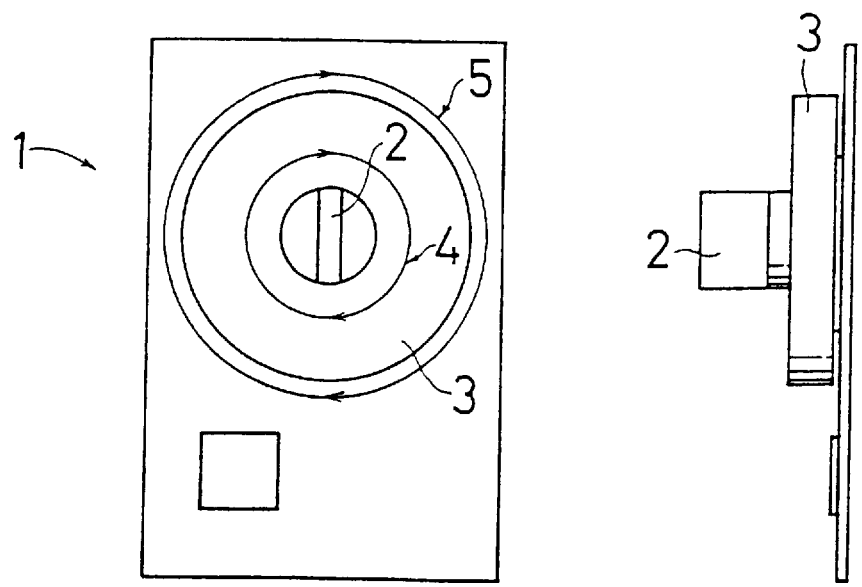
FIG. 17A is a plan view showing a configuration of the scanning device 1 of a laser printer according to the prior art.
FIG. 17B is a side view of the scanning device 1.

FIG. 16A is a plan view showing the rotor 43 and the scanning mirror 29 with a test being conducted using the configuration of FIGS. 15A to 15C. FIG. 16B is a side view showing the motor 43 and the scanning mirror 29 of FIG. 16A. The configuration of the rotor 43 and the scanning mirror 29 used for the test is similar to that shown in FIG. 13A, in which the same component parts are designated by the same reference numerals as the corresponding parts in FIG. 13A. Therefore the component parts will not be described any further.

The rotor 43 is mounted on a bearing 113 arranged on the base plate 41. The diameter r of the rotor 43 is 37 mm. The scanning mirror 29 is arranged on the rotor 43 through a mirror rest 111. The height of the mirror rest 111 corresponds to the width of the cover 45. The cover 45, as shown in FIG. 16B, is configured to surround the portion of the rotary part T under the mirror rest 111. This rotary part T generates the rotating air flow 51. The scanning mirror 29 arranged on the rotor 43 is 7 mm tall, 9 mm wide and 3 mm thick, and mirror surfaces are formed on both sides thereof. The cover 88 is configured to surround the rotary part S of the scanning mirror 29. This rotary part S generates the rotating air flow 52.

The mounting position of the air flow separation members 189, 190 shown in FIG. 15A is determined by angles C, D which a perpendicular line 201 to the side of the cover 88 having the air flow outlet port 74 and passing through the rotation center of the scanning mirror 29 forms with the air flow separation members 189, 190, respectively. In FIG. 15B, a perpendicular line 202 to the side of the cover 45 having the air flow outlet port 47 and passing through the rotation center of the rotor 43 is used as a base line. The mounting position of the air flow separation member 48, on the other hand, is determined by the angle E that a straight line 204 connecting the end 203 in the vicinity of the rotor 43 of the air flow separation member 48 and the rotation center of the rotor 43 forms to the normal 202 providing the base line.

In the blowing performance test, the rotor 43 and the scanning mirror 29 are rotated at a speed of 17717 rpm under the above-mentioned conditions. A visually recognizable colored smoke such as tobacco or incense is supplied together with the suction air flows 54, 84 by way of the air flow inlet ports 46, 72. The smoke was visually observed by the test person, whereby the acceptability or non-acceptability of the capacity and velocity of the discharge air flows 53, 85 was indirectly confirmed. Also, the test person listened to the wind-breaking sound of the discharge air flows 53, 85 thereby confirming the acceptability or non-acceptability of the sound level of the wind-breaking sound as a noise.

The results of the test conducted in the manner described above are shown in Tables 1 to 6.

[TABLE 1]

| Angle C (degree) | 30 | 40 | 50 | 60 | 70 | 80 |
|---|---|---|---|---|---|---|
| Acceptability | X | X | ○ | ○ | Δ | X |

[TABLE 2]

| Angle D (degree) | 10 | 20 | 30 | 40 | 50 | 60 |
|---|---|---|---|---|---|---|
| Acceptability | X | Δ○ | ○ | ○ | X | X |

[TABLE 3]

| Angle C (degree) | 30 | 40 | 50 | 60 | 70 | 80 |
|---|---|---|---|---|---|---|
| Acceptability | X | Δ | ○ | ○ | ○ | ○ |

[TABLE 4]

| Angle D (degree) | 10 | 20 | 30 | 40 | 50 | 60 |
|---|---|---|---|---|---|---|
| Acceptability | X | Δ | Δ | ○ | ○ | ○ |

[TABLE 5]

| Angle E (degree) | 15 | 20 | 25 | 30 | 35 | 40 |
|---|---|---|---|---|---|---|
| Acceptability | X | Δ | ○ | ○ | X | X |

[TABLE 6]

| Angle D (degree) | 15 | 20 | 25 | 30 | 35 | 40 |
|---|---|---|---|---|---|---|
| Acceptability | ○ | ○ | ○ | Δ | X | X |

Table 1 shows the results of confirming the capacity and velocity of the discharge air flow 85 obtained by changing the angle C of the air flow separation member 189 in angular units of 10 degrees in the range of 30 to 80 degrees while fixing the angle D of the air flow separation member 190 to 30 degrees. Table 2 shows results of confirming the capacity and velocity of the discharge air flow 85 by changing the angle E of the air flow separation member 190 in angular units of 10 degrees in the range of 10 to 60 degrees while fixing the angle C of the air flow separation member 189 to 60 degrees.

Table 3 shows the results of confirming whether the magnitude of the winding-breaking sound of the discharge air flow 85 constitutes a noise with the angle C of the air flow separation member 189 changed in 10-degree units from 30 to 80 degrees while fixing the angle D of the air flow separation member 190 to 30 degrees. Table 4 shows the results of confirming whether the magnitude of the wind-breaking sound of the discharge air flow 85 constitutes a noise with the angle E of the air flow separation member 190 changed in 10-degree units from 10 to 60 degrees while fixing the angle C of the air flow separation member 189 to 60 degrees.

Table 5 shows the results of confirming the capacity and velocity of the discharge air flow 53 by changing the angle E from 15 to 40 degrees in five-degree units for determining the mounting position of the air flow separation member 48. Table 6 shows the results of confirming whether the magnitude of the wind-breaking sound of the discharge air flow 53 constitutes a noise with the angle E changed from 15 to 40 degrees in five-degree units for determining the mounting position of the air flow separation member 48.

The results of Tables 1 and 3 show that the angle C for determining the mounting position of the air flow separation member 189 is properly at 50 or 60 degrees. The results of the test shown in Tables 2 and 4, on the other hand, demonstrate that the proper angle D for determining the mounting position of the air flow separation member 190 is 40 degrees. The test results in Tables 5 and 6, on the other hand, shows that the proper angle E for determining the mounting position of the air flow separation member 48 is 25 degrees. Provision of the air flow separation members 189, 190 or 48 at the position determined by the blowing performance test can produce the discharge air flows 53, 85 of optimum capacity and velocity of air flow from the scanning device 28f. Further, the noises which otherwise might be caused by the discharge air flows 53, 85 is prevented.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A laser printer comprising:
   a photosensitive member;
   exposure means for scanning a laser beam by rotating a scanning mirror by a motor, exposing the surface of the photosensitive member to the laser beam, and forming an electrostatic latent image;

developing means for developing the electrostatic latent image into a visible toner image;

transfer means for transferring the toner image onto the surface of a recording medium; and fixing means for fixing the toner image transferred onto the surface of the recording medium; the laser printer further comprising:

air flow generating means arranged in such a position as to surround the scanning mirror, including at least one air flow inlet section and at least one air flow outlet section, the air flow generating means for stemming rotating air flow generated around the scanning mirror by at least one air flow separation member having an end proximate the scanning mirror, and generating an air flow different from the rotating air flow; and duct means for connecting at least one of the air flow inlet section and the air flow outlet section to a predetermined heat generating part, the duct means including at least one bent part, and a dead end on the downstream side in the direction of air flow into the bent part.

2. The laser printer of claim 1, wherein the air flow generating means includes an air flow inlet port in the proximity of the rotation center of the scanning mirror.

3. The laser printer of claim 2, the laser printer further comprising:

filter means for removing dust which deteriorates optical characteristics of the scanning mirror, disposed in the air flow inlet port.

4. The laser printer of claim 1, the laser printer further comprising:

filter means for removing dust which deteriorates optical characteristics of the scanning mirror, disposed in an air path into the air inlet section.

5. A laser printer comprising:

a photosensitive member;

exposure means for scanning a laser beam by rotating a scanning mirror by a motor exposing the surface of the photosensitive member to the laser beam, and forming an electrostatic latent image;

developing means for developing the electrostatic latent image into a visible toner image;

transfer means for transferring the toner image onto the surface of a recording medium; and fixing means for fixing the toner image transferred onto the surface of the recording medium; the laser printer further comprising:

air flow generating means arranged in such a position as to surround a rotor of the motor for rotating the scanning mirror, including at least one air flow inlet section and at least one air flow outlet section, the air flow generating means for stemming rotating air flow generated around the rotor by at least one air flow separation member having an end proximate the rotor, and generating an air flow different from the rotating air flow; and duct means for connecting at least one of the air flow inlet section and the air flow outlet section to a predetermined heat generating part, the duct means including at least one bent part, and a dead end on the downstream side in the direction of air flow into the bent part.

6. The laser printer of claim 5, wherein the air flow generating means includes an air flow inlet port in the proximity of the rotation center of the scanning mirror.

7. The laser printer of claim 5, the laser printer further comprising:

filter means for removing dust which deteriorates optical characteristics of the scanning mirror, disposed in an air path into the air inlet section.

8. The laser printer of claim 6, the laser printer further comprising:

filter means for removing dust which deteriorates optical characteristics of the scanning mirror, disposed in the air flow inlet port.

9. A laser printer comprising:

a photosensitive member, exposure means for scanning a laser beam by rotating a scanning mirror by a motor, exposing the surface of the photosensitive member to the laser beam, and forming an electrostatic latent image;

developing means for developing the electrostatic latent image into a visible toner image;

transfer means for transferring the toner image onto the surface of a recording medium; and fixing means for fixing the toner image transferred onto the surface of the recording medium;

the laser printer further comprising:

(a) the scanning mirror being formed of a plate having a plane mirror;

(b) a cover for covering the scanning mirror having a side wall entrance window through which the laser beam passes to the scanning mirror, and having a side wall exit window through which the laser beam from the scanning mirror passes to the photosensitive member;

(c) an air flow separating member located in the cover having an end extending close to an area where the scanning mirror is rotating in a predetermined direction, and for stemming a rotating air flow generated around the scanning mirror;

(d) the cover further having an air flow inlet port formed upstream in the rotating direction of the scanning mirror with respect to the air flow separating member, and having an air flow outlet port formed downstream in the rotating direction of the scanning mirror with respect to the air flow separating member; and (e) a predetermined heat generating part located within an air flow which is generated by rotation of the scanning mirror and passes through the air flow inlet port and the air flow outlet port.

10. The laser printer of claim 9 including:

duct means for connecting at least one of the air flow inlet port and the air flow outlet port to said predetermined heat generating part.

11. A laser printer comprising:

a photosensitive member;

exposure means for scanning a laser beam by rotating a scanning mirror by a motor, exposing the surface of the photosensitive member to the laser beam, and forming an electrostatic latent image;

developing means for developing the electrostatic latent image into a visible toner image;

transfer means for transferring the toner image onto the surface of a recording medium; and fixing means for fixing the toner image transferred onto the surface of the recording medium;

the laser printer further comprising:

(a) the scanning mirror being formed of a plate having a plane mirror;

(b) a cover for covering the scanning mirror;

(c) a plurality of air flow separating members located in the cover, each air flow separating member having an end extending close to an area where the scanning mirror is rotating in a predetermined direction, and for stemming a rotating air flow generated around the scanning mirror;

(d) the cover having a plurality of air flow inlet ports formed upstream in the rotating direction of the scanning mirror with respect to each of the air flow separating members, and having a plurality of air flow outlet ports formed downstream in the rotating direction of the scanning mirror with respect to each of the air flow separating members;

(e) the laser beams passing to the scanning mirror through one of the ports and passing from the scanning mirror through the remaining one of the ports; and (f) a predetermined heat generating part located within an air flow which is generated by rotation of the scanning mirror and passes through each air flow inlet port and the air flow outlet port.

12. The laser printer of claim 11, wherein the cover has an opening formed at a cover portion corresponding to a rotation center of the scanning mirror to enhance air flowing toward each air flow outlet port.

13. The laser printer of claim 12 including:

duct means for connecting at least one of the air flow inlet port and the air flow outlet port to said predetermined heat generating part.

14. The laser printer of claim 11 including:

duct means for connecting at least one of the air flow inlet port and the air flow outlet port to said predetermined heat generating part.

15. A system for cooling a heat generating part in a laser printer, said system comprising:

a scanning mirror comprising a rotating planar mirror, the scanning mirror directing a laser beam to scan a photosensitive member;

a chamber surrounding the scanning mirror, the chamber including at least one air flow inlet port and at least one air flow outlet port, the chamber further including at least one air flow separating member having an end proximate the rotating scanning mirror, the air flow separating member for directing air flow caused by the scanning mirror to flow from the at least one air flow inlet port to the at least one air flow outlet port;

a duct coupled to at least one of the at least one air flow inlet port and at least one air flow outlet port, and further coupled proximate the heat generating part, for allowing air flow caused by the scanning mirror to flow proximate the heat generating part, the duct including at least one dead end.

16. The system of claim 15 wherein the duct includes at least one bent portion.

* * * * *